(12) United States Patent
Kim et al.

(10) Patent No.: US 8,260,431 B2
(45) Date of Patent: Sep. 4, 2012

(54) MULTI-MODE PET TRAINING DEVICE

(75) Inventors: Joon S. Kim, Dallas, TX (US); Bryant Y. Kim, Dallas, TX (US)

(73) Assignee: DT Systems, Inc., Dallas, TX (US)

( * ) Notice: Subject to any disclaimer, the term of this patent is extended or adjusted under 35 U.S.C. 154(b) by 747 days.

(21) Appl. No.: 11/705,886

(22) Filed: Feb. 14, 2007

(65) Prior Publication Data

US 2007/0191913 A1    Aug. 16, 2007

Related U.S. Application Data

(60) Provisional application No. 60/773,498, filed on Feb. 15, 2006.

(51) Int. Cl.
*A61N 1/00* (2006.01)
(52) U.S. Cl. ............... 607/60; 607/30; 607/32
(58) Field of Classification Search .......... 607/30, 607/60
See application file for complete search history.

(56) References Cited

U.S. PATENT DOCUMENTS

| 6,393,325 B1* | 5/2002 | Mann et al. ............ 607/46 |
| 2003/0116099 A1* | 6/2003 | Kim et al. ............ 119/719 |

* cited by examiner

*Primary Examiner* — Nicole F Lavert
(74) *Attorney, Agent, or Firm* — James A. Harrison

(57) ABSTRACT

The pet training device comprises a handheld wireless command module, a wireless receiver module connected to an adjustable collar assembly. The wireless command module is used to select a stimulation mode, stimulation duration, a Jump mode, a Rise mode, and a stimulation intensity level through the used of one-touch digital switches located on the device front panel. The selected functions are displayed on an LCD. The stimulation commands are transmitted to the wireless receiver module where they are demodulated into control signals that trigger a shock, a beep, a vibration, or a combination thereof. When the wireless receiver is placed in the no-bark mode, the wireless receiver module will generate a shock when triggered by a bark sensor. A Jump mode is provided to instantly increase stimulation from a currently defined level. A Rise mode is provided to gradually and continuously increase the stimulation level.

20 Claims, 23 Drawing Sheets

Wireless Command Module

Wireless Command Module

Transmission Message 130

LCD Display 107

Wireless Command Module 100

Wireless Command Module 100

Wireless Receiver Module 300

Wireless Receiver Module 200

Shock Module 316

Vibrate Module 320

No-bark Module 324

Receiver Module Method Flow Chart

Receiver Module Method Flow Chart
(continued from Figure 11)

Transmitter Module Method flow chart

Normal Mode selected

Rise or Jump Mode selected

Jump and Rise Mode flowchart

Functional block diagram of transmitter unit

Rise mode with random maximum intensity duration

Random Max period

System with Receiver Safety Mode

Increasing Jump Mode

Pulse wave forms for commanded intensity

Increased number of pulses for increased intensity

Comparison of pulse methods

Numerically specified pulse intensity level

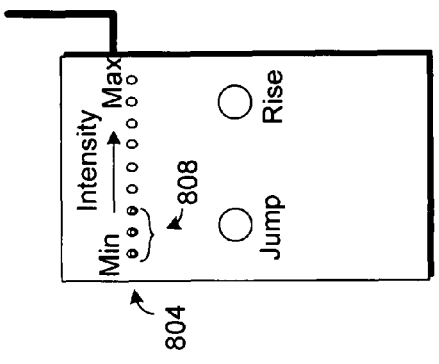
FIG. 28 Controller with LED Display
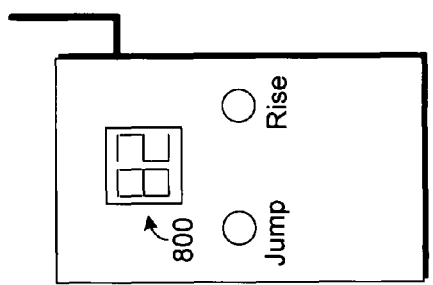
FIG. 27 Controller with Numeric Display
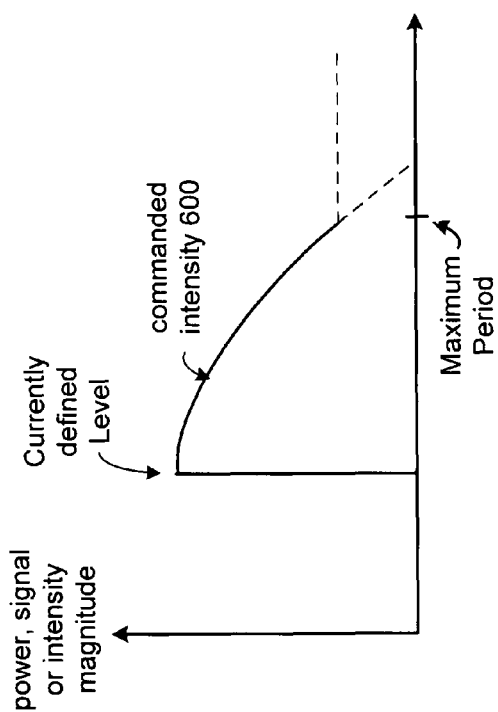
FIG. 29 Decreasing Rise Mode Function Transmitter Module Method flow chart

MULTI-MODE PET TRAINING DEVICE

CROSS REFERENCE TO RELATED APPLICATION

This application claims priority to U.S. Provisional Patent Application Ser. No. 60/773,498, filed Feb. 15, 2006, which is incorporated herein by reference for all purposes.

BACKGROUND OF THE INVENTION

1. Technical Field of the Invention

This invention relates generally to an apparatus and a method for animal behavior modification and, more particularly, to an apparatus and a method for animal training and for the prevention of barking.

2. Description of the Related Art

Animals exhibiting undesirable behavior, such as barking excessively and damaging possessions, typically require behavior modification. Undesirable behavior such as excessive barking is not only irritating to family and neighbors but, in some municipalities, is a violation of city ordinance punishable by fines or removal of the offending animal. It is desirable, therefore, to train the offending animal by modifying the undesirable behavior.

Typical training includes unpleasant stimulation during the undesirable behavior in order to discourage the animal, often under the control of a remote wireless transmitter operated by a trainer or dog owner. Typical types of stimulation include shock, vibration, or a combination of both. The prior art includes collars that provide such stimulation by attaching a shock and vibration device to the animal by way of a collar. The electrical or mechanical stimulation can be set to a low level then manually increased by rotating a dial or moving a slide switch until the behavior modification is accomplished (the dog stops the negative behavior).

Conventional training devices use a transmitter with analog controls to set a stimulation mode and a stimulation level. For example, an analog control might comprise a potentiometer. The transmitter then sends the stimulation information via a radio wave to a receiver on the dog's collar. The receiver then converts the radio waves into signals that may be processed and that will activate the shock and vibration devices through associated control interfaces and structure.

A number of problems exist with analog controls. The first problem is that the analog controls are difficult to set accurately. Stated differently, rotating a control knob a small amount does not clearly delineate a specified change in stimulation levels. A second problem with analog controls is that, once set, the setting can be too easily changed by accidentally touching the control. A third problem with analog controls is that they are typically "power hungry" devices, meaning they consume a great deal of power. This is a considerable problem with battery-operated devices. Yet another significant problem with conventional training devices is the absence of a display to provide information to the user regarding the stimulation level. Thus, the trainer has to manually check the position of the analog controls to verify the settings and make an approximate determination of the stimulation level.

In order to modify behavior, the person performs the training with a remote controlled training device. Finally, a trainer may occasionally need to increase the stimulation at a very fast rate to a maximum level in order to stop very negative or dangerous behavior. For example, it may be necessary to stop a dog from running out into traffic. There is a need in the art, therefore, for a device that combines a stimulator function (requiring human activated controls) and a no-bark function (not requiring human interaction) in a single device. Additionally, there is a need to provide feedback to the user while extending battery life by eliminating analog controls.

BRIEF SUMMARY OF THE INVENTION

A wireless training system comprises a handheld wireless command module and a wireless receiver module connected to an adjustable collar assembly. The wireless command module is used to select a stimulation mode, a stimulation duration for higher levels of stimulation, and a stimulation intensity level through the use of one-touch digital switches located on the device front panel. The wireless training device includes circuitry for gradually increasing the stimulation level from a currently defined level to a maximum level for a mode of operation referenced herein as the Rise mode. In the Rise mode, the stimulation level increases continually to a maximum level as long as the Rise mode is selected and subsequently remains at the maximum level as long as the Rise mode remains selected. In one embodiment, the maximum level is a maximum level of the wireless training system (i.e., a factory/design setting). In another embodiment, the maximum level is a previously specified maximum level that may be set by the dog trainer/owner. Alternatively, the stimulation level may be gradually decreased from the currently defined level.

The wireless training device further includes circuitry for immediately increasing a stimulation level from a currently defined level directly to a changed level for the Jump mode whenever the Jump mode is selected. The stimulation level is kept at the previously specified level as long as the Jump mode is selected. In yet another embodiment, the stimulation level jumps to the previously specified jump level and, upon a specified switch action, increases changes from the previously specified jump level. In yet another alternate embodiment, a plurality of jump levels are defined wherein the plurality of jump levels are selected through specified switch actions. Moreover, the plurality of jump levels may include activation of different stimulations. For example, in one embodiment, a first depression of the Jump mode button results in a "jump" to a first previously specified level of currently selected stimulation mode (e.g., shock, vibration, shock and vibration). Upon a subsequent depression of the Jump mode button within a specified period since the first depression of the Jump mode button, an unselected stimulation becomes activated. For example, if only shock is selected, vibration would be added. Similarly, if vibration is selected, a subsequent depression would result shock being added as a stimulation. In yet another embodiment, the selected stimulation mode is increased to the first previously specified level upon the initial depression of the Jump mode button. Upon a subsequent depression of the Jump mode button within a specified amount of time, the stimulation level is increased to a second previously specified level (or, alternatively, to the maximum) level. In yet another embodiment, a plurality of Jump mode buttons are defined to allow activation of a plurality of specified stimulation levels. The stimulation levels thus include at least two user defined levels representing a currently defined training stimulation level and a previously defined stimulation level that is less than or equal to the maximum stimulation level of the wireless training device. In general, one or more previously specified stimulation levels are selected through one or more buttons (or switches) by one or more depressions of the buttons within a specified amount of time.

The selected functions are displayed on an LCD screen, in one embodiment, which provides convenient confirmation of the training program. The stimulation commands are transmitted to the wireless receiver module attached to the animal with an adjustable collar. The adjustable collar maintains the vibration motor and shock electrodes in close proximity to the animal's vocal cords. The transmitted stimulation commands are demodulated by the receiver module into control signals that trigger a shock, a vibration, or a shock and vibration. When the wireless receiver is placed in the no-bark mode, the wireless receiver module will generate a shock when triggered by a bark sensor. Power controllers built into both the wireless command module and wireless receiver module optimizes battery life by turning the devices off after a period of inactivity.

Other features and advantages of the present invention will become apparent from the following detailed description of the invention made with reference to the accompanying drawings.

BRIEF DESCRIPTION OF THE SEVERAL VIEWS OF THE DRAWINGS

FIGS. 27 and 28 illustrate alternate embodiments of controllers;

FIG. 29 is a curve that illustrates an alternate embodiment for operation of the Rise mode in which the commanded intensity is gradually decreased.

These and other features, aspects and advantages of the present invention will be more fully understood when considered with respect to the following detailed description, appended claims and accompanying drawings wherein:

DETAILED DESCRIPTION OF THE INVENTION

Figure 1:
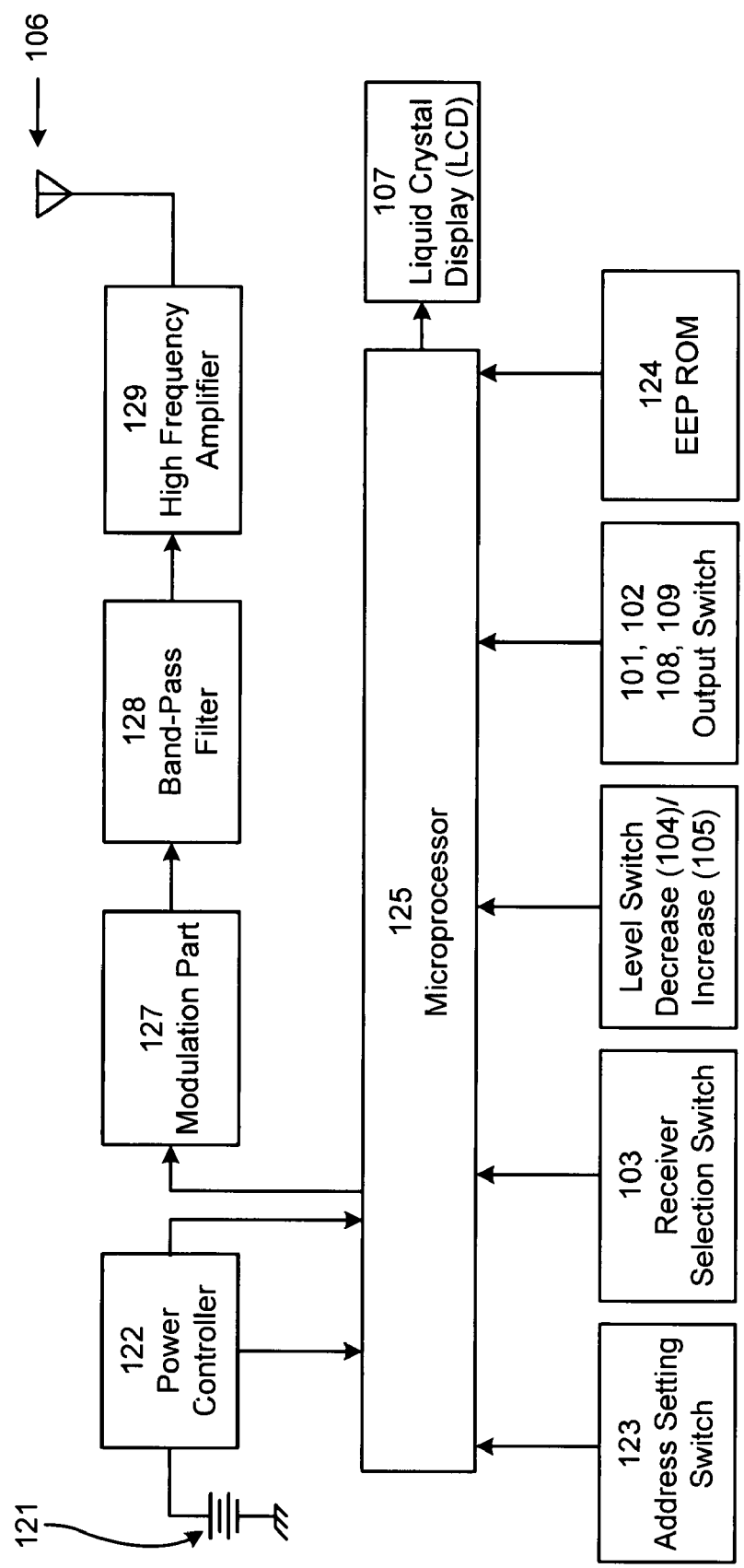
FIG. 1 is a block diagram of a wireless command module according to one embodiment of the present invention.
Figure 4:
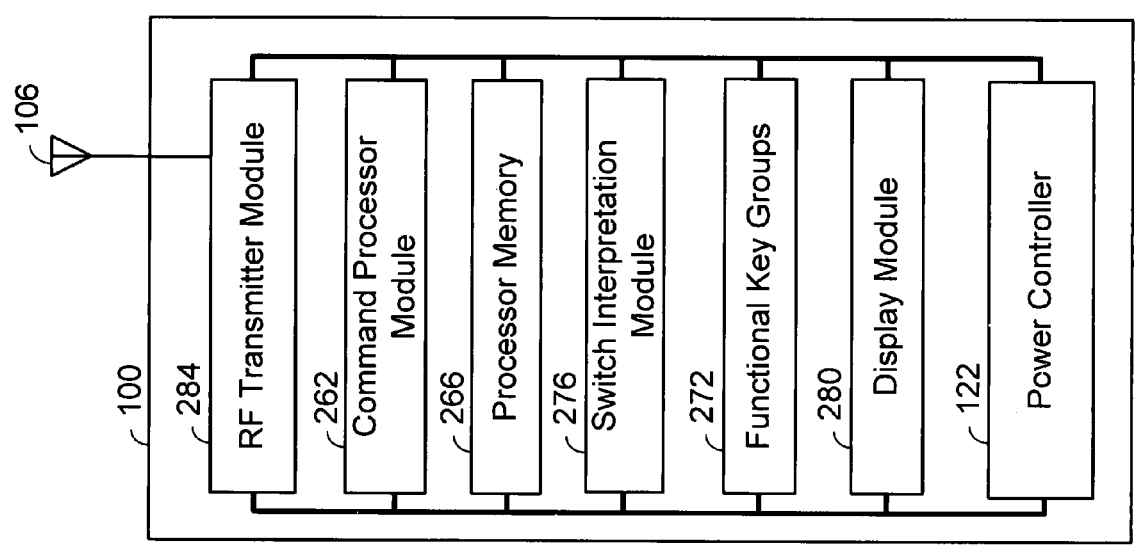
FIG. 4 is a functional block diagram of a wireless command module according to one embodiment of the invention.

FIG. 1 is a block diagram of a wireless command module according to one embodiment of the present invention. A wireless command module, in one embodiment, includes a receiver selection switch 103 to enable a user to select a receiver to which stimulation commands are to be transmitted. A level switch having a decrease position 104 and an increase position 105 is used to set stimulation levels for at least one mode of operation (e.g, a normal stimulation mode wherein the stimulation is merely at the set level). Switch positions 104 and 105 may also be used, in one embodiment, to set jump levels and maximum levels for Jump mode operation and Rise mode operation as will be described in greater detail below. A battery 121 provides unregulated voltage to a power controller 122, which provides regulated voltage to the wireless command module components and shuts off power to the transmitter components upon receipt of a shut-down command. A microprocessor 125 controls operation of the transmitter, generates control signals responsive to a plurality of switches, formats the control signals for transmission, and displays the operating mode on Liquid Crystal Display (LCD) 107. The microprocessor function may be implemented in various methods, such as operational logic formed in a field programmable gate array (FPGA) or may be integrated with other functions on an application specific integrated circuit (ASIC). Memory device EEP ROM 124 stores the various operating instructions, the stimulation level, and the microprocessor algorithm. EEP ROM 124 may be implemented in various forms such as non-volatile flash memory. Additionally, EEP ROM 124 may be external to the microprocessor 125, as shown in FIG. 4, or may be formed on the integrated circuit with the processor function.

Upon application of power, the microprocessor 125 performs a power-on self test (POST), initializes the transmitter, initializes an inactivity timer, reads the settings of the plurality of switches, then reads the previously stored function and intensity level from EEP ROM 124. After reading the addresses defined by an address setting switch 123, microprocessor 125 stores the addresses in EEP ROM 124. In one embodiment of the invention, the addresses defined by address setting switch 123 are set manually by a plurality of dual inline package (DIP) switches. In an alternate embodiment, each address is programmable to allow the user to add addresses as needed.

In an alternate embodiment, the transmitter always sends out a specific address for the selected receiver. In this embodiment, the receiver has a plurality of DIP switches to set the receiver address to match the transmitter address.

After initialization, microprocessor 125 displays the receiver selection, function, and intensity level on LCD 107. Additionally battery status is displayed and continuously updated. At this point, the microprocessor 125 waits for the user to press an output switch: instantaneous output switch 101, continuous output switch 102, vibrate output switch 108 or vibrate and shock output switch 109. Once an output switch is pressed, microprocessor 125 generates a formatted transmission message containing the stimulation mode, stimulation intensity level, stimulation duration, and receiver address for processing by a modulation part 127.

Modulation part 127 generates an RF oscillation modulated with the transmission message. The modulated RF oscillation is then filtered by a band-pass filter 128 to remove harmonics and spurious signals outside the desired RF bandwidth. The filtered and modulated RF signal is amplified by a high frequency amplifier 129 for transmission by transmitting antenna 106.

Figure 2:
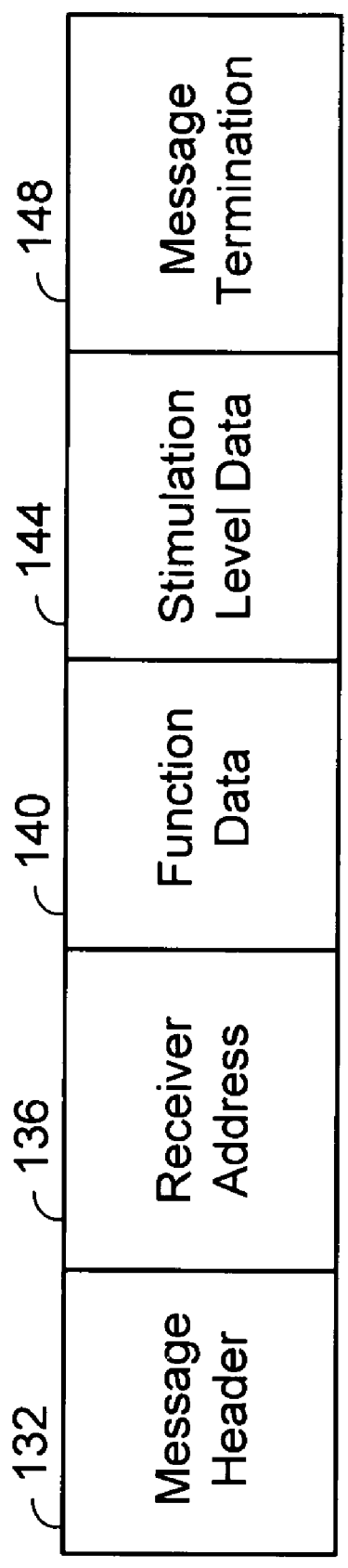
FIG. 2 is an illustration of a transmission message according to one embodiment of the invention.

FIG. 2 is a diagram of the formatted transmission message, shown generally at 130, generated by the Microprocessor 125 of FIG. 1. A message header 132 contains a binary pattern to identify the start of a signal. A receiver address 136 contains the receiver address that identifies a specific receiver from a plurality of receivers. In one embodiment, the address of the receiver is received by the microprocessor as set by a plurality of DIP switches. Thus, according to a selected receiver, the microprocessor returns a previously specified corresponding address and inserts the address into receiver address 136. A function data 140 defines the desired stimulation: vibrate, vibrate and shock, instant shock, and continuous shock. In one embodiment, a no-bark function is also specified wherein the receiver module responds with a specified function whenever barking is detected. A stimulation level data 144 contains the desired shock level. A message termination 148 contains binary data that signifies the end of the message. In an alternate embodiment, the duration of the stimulation (i.e., shock and vibrate) is programmable. In this embodiment, the transmission message will contain a duration data part to define the length of stimulation. The length of the transmission message can be extended to accommodate added functionality of alternate embodiments.

Figure 3:
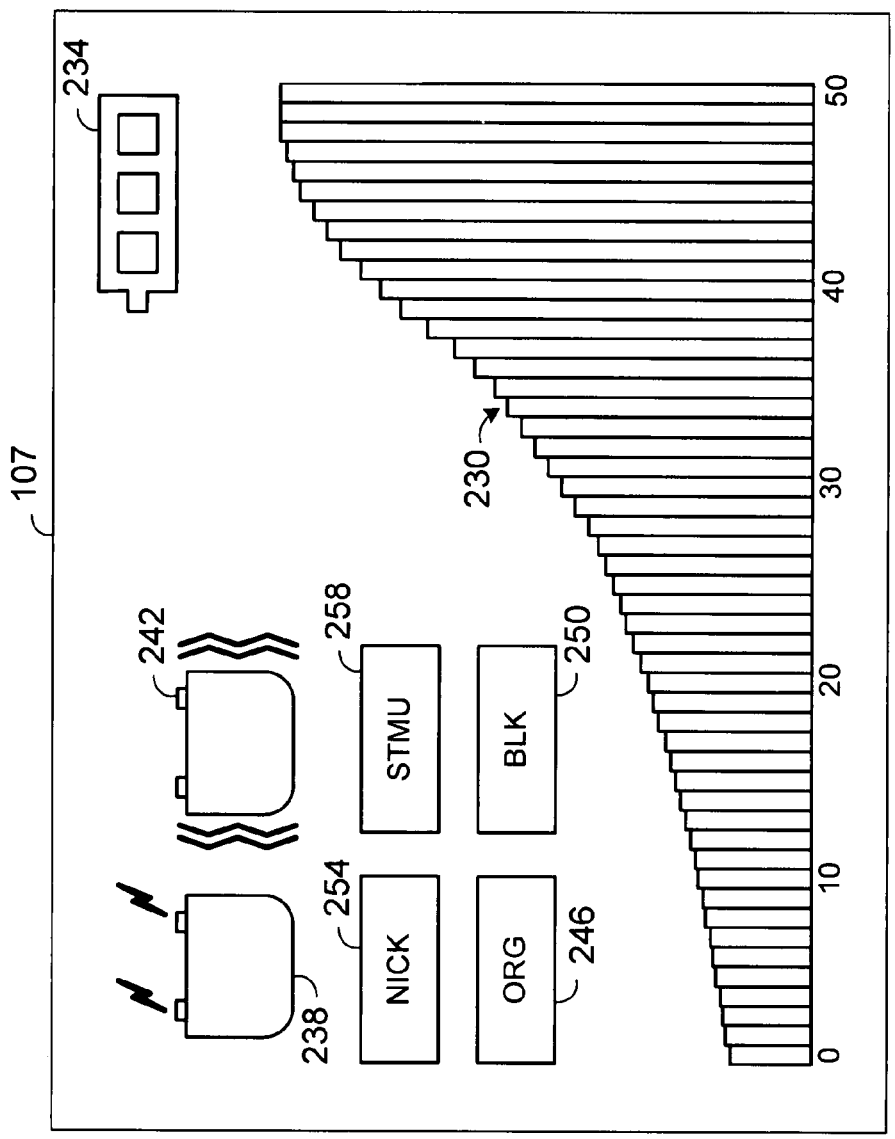
FIG. 3 is an illustration of a display of a liquid crystal display screen of a controller according to one embodiment of the invention.

FIG. 3 is an illustration of the liquid crystal display (LCD) 107 of one embodiment of the present invention. An intensity level bar graph 230 shows the selected intensity level. Thus, the bar graph level decreases or increases as a decrease or an increase in the intensity level is selected respectively. Referring back to FIG. 3, a battery status 234 indicates the estimated residual battery power. Graphical symbols 238 and 242 indicate the selected stimulation mode according to the mode selected by output mode switches of a wireless transmitter unit. Graphical symbol 238 indicates the shock mode has been selected while symbol 242 indicates the vibrate mode has been selected. When the shock and vibrate mode is selected, both graphical symbols 238 and 242 will be on. Receiver selection is indicated by symbols 246 and 250. Symbol 246, ORG, indicates that a primary receiver is selected, while symbol 250, BLK, indicates a secondary receiver has been selected. In an alternate embodiment, the ORG and BLK could be replaced by a plurality of alphanumeric symbols to allow animal names to be programmed into the display. Using this method, the trainer could more easily identify the selected receiver. Symbols 254 and 258 illuminate for a brief period during message transmission to verify the transmission is underway. Symbol 254, NICK, indicates a shock command is being transmitted, while symbol 258, STMU, indicates a vibrate command is being transmitted. The inventive wireless command module includes circuitry that defines logic to generate the described display.

FIG. 4 is a functional schematic diagram of a wireless command module 100 according to one embodiment of the present invention. A power controller 122 performs the power management function as previously described. When first turned on, a command processor module 262 performs a power-on self test (POST), initializes an RF transmitter module 284, and reads the switch settings defined by a switch interpretation module 276. During POST, command processor module 262 resets an inactivity timer. This inactivity timer defines the period of time after which command processor module 262 issues a shut-down command to power controller 122. The inactivity timer is re-set each time a key is pressed.

Functional key groups 272 define three functional groups of one-touch switches to control operation of wireless command module 100. When a one-touch key is pressed, switch interpretation module 276 determines which key was pressed and then provides the information to command processor module 262. Command processor module 262 updates a display module 280 and adds the selected stimulation mode to the formatted transmission message, if required. If the key pressed was an output switch, i.e., vibrate or shock key, the formatted transmission message is provided to RF transmitter module 284 for transmission via transmitter antenna 106. A processor memory 266 stores the command processor module process algorithm, as well as the selected operating mode and receiver address. Processor memory 266 comprises logic circuitry and EEP ROM 124, as described in FIG. 1.

Figure 5:
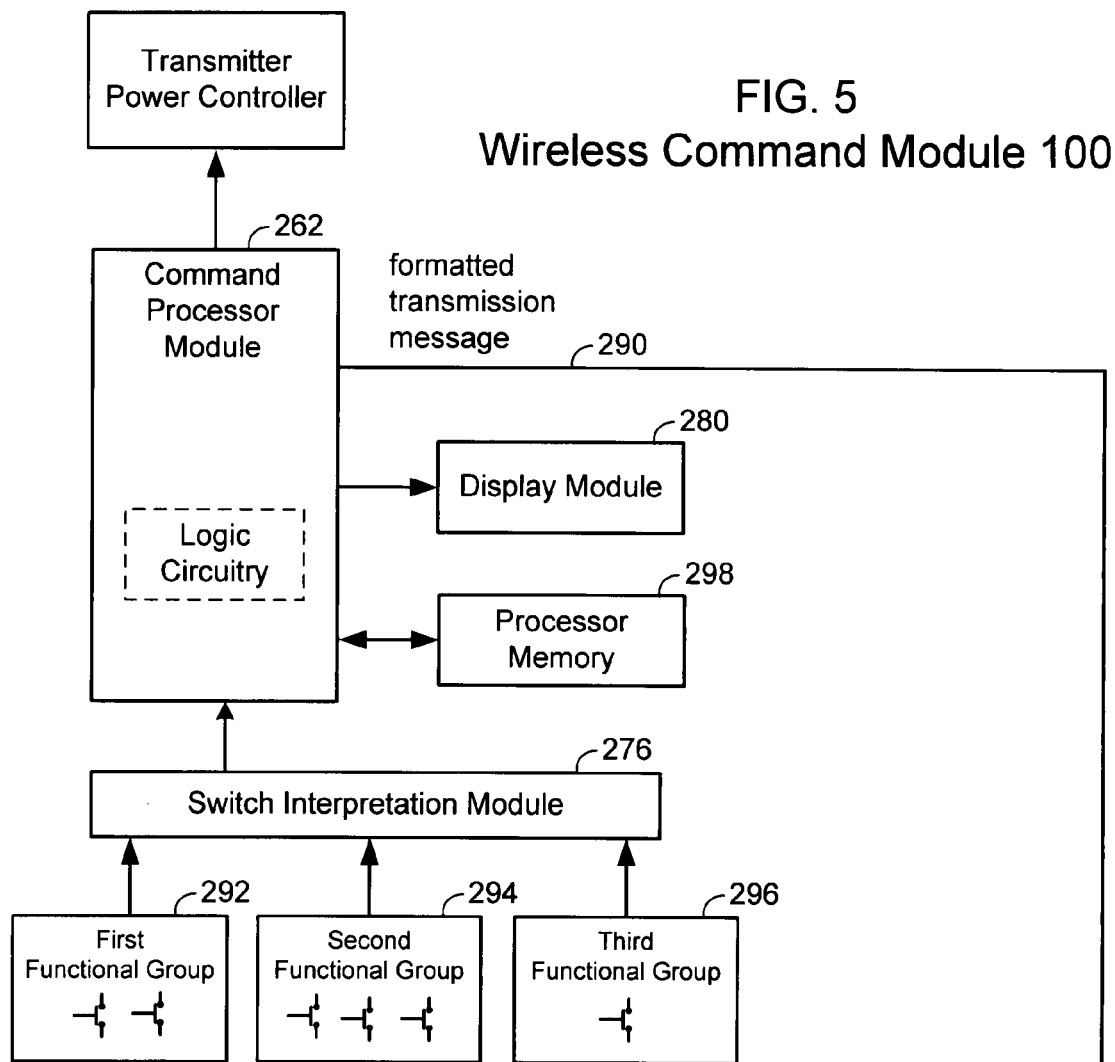
FIG. 5 is a functional schematic diagram of the wireless command module according to one embodiment of the present invention.

FIG. 5 is a functional schematic diagram of the wireless command module 100 showing a detailed view of RF transmitter module 284. Modulation part 127 comprises a mixer 286 and a local oscillator (LO) 288. Mixer 286 receives the formatted transmission message from command processor module 262 on line 290. The LO 288 frequency of oscillation, set to the desired RF carrier frequency, is coupled to mixer 286 where it is mixed to form a modulated RF signal. The modulated RF signal is provided to a filter module 291 wherein frequencies below a low corner frequency and above a high corner frequency are sharply attenuated. The filtered modulated RF signal is coupled to high frequency (HF) amplifier 129 for transmission via transmitter antenna 106.

In wireless command module 100, switches are grouped according to function, in which a first functional group 292 comprises one or more switches for selecting a receiver address and for defining a plurality of addresses corresponding to the receivers in use. A second functional group 294 comprises one or more switches for setting the stimulation mode. A third functional group 296 comprises at least one one-touch switch for setting a stimulation intensity level. The output of each functional group is coupled to switch interpretation module 276 wherein the switch information is encoded for processing by command processor module 262. Display module 280 comprises logic circuitry and LCD 107 (not shown). Logic circuitry is for generating graphical symbols responsive to control signals received from command processor module 262. LCD 107 operates as will be described in FIG. 7. Processor memory 298 is operable to store data and computer instructions that define operational logic of wireless command module 100.

Figure 6:
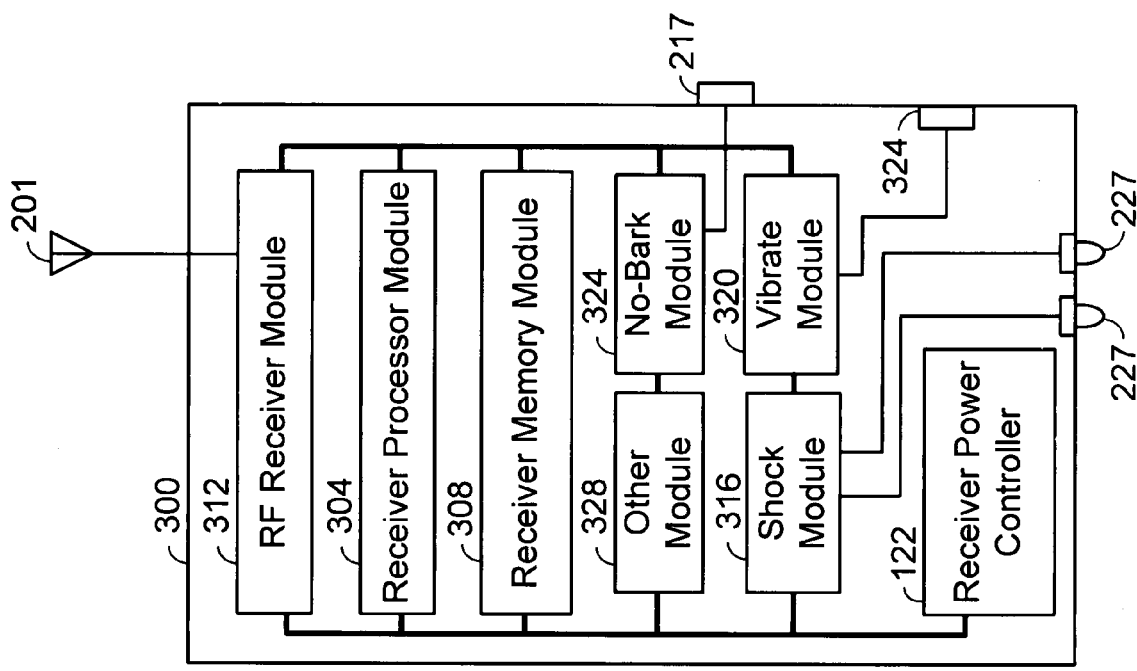
FIG. 6 is a functional schematic diagram of the wireless receiver module according to one embodiment of the present invention.

FIG. 6 is a functional schematic diagram of a wireless receiver module 300 according to one embodiment of the present invention. A power controller 122 operably provides power to each module as shown in FIG. 6 as previously described. A receiver processor module 304 contains logic circuitry to control operation of the wireless receiver module 300 according to program instructions stored in a receiver memory module 308. In the present embodiment, receiver memory module 308 is formed in EEP ROM external to receiver processor module 304, however, receiver memory module 308 could be formed in a variety of known formats either internal or external to receiver processor module 304. Receiver memory module 308 could also be formed in alternate embodiments such as non-volatile flash memory.

Receiver processor module 304 also processes digital data, received from an RF receiver module 312 via an antenna 201, into a plurality of stimulation control signals responsive to the transmitted control commands received from the wireless command module. The stimulation control signals are provided to a shock module 316 and a vibrate module 320. Shock module 316 processes the shock control signal into an analog shock voltage sufficient to cause a shock to be generated at shock electrodes 227. Vibrate module 320 processes the vibrate control signal in a waveform sufficient to drive a vibration motor (not shown). In the no-bark operating mode, bark sensor 217 provides vibrations, responsive to the barking, to no-bark module 324. Upon receipt of the vibrations, no-bark module 324 processes the vibrations into a digital signal suitable for processing by receiver processor module 304 which then sends a vibrate control signal to vibrate module 320, thus preventing barking.

Other module 328 anticipates alternate embodiments that may include sonic or ultrasonic functions. Sonic functions may include programmable commands synthesized from the trainer's voice to control animal behavior. An ultrasonic function would use variable strength sound waves (higher than the human hearing range) to train the animal.

Figure 7:
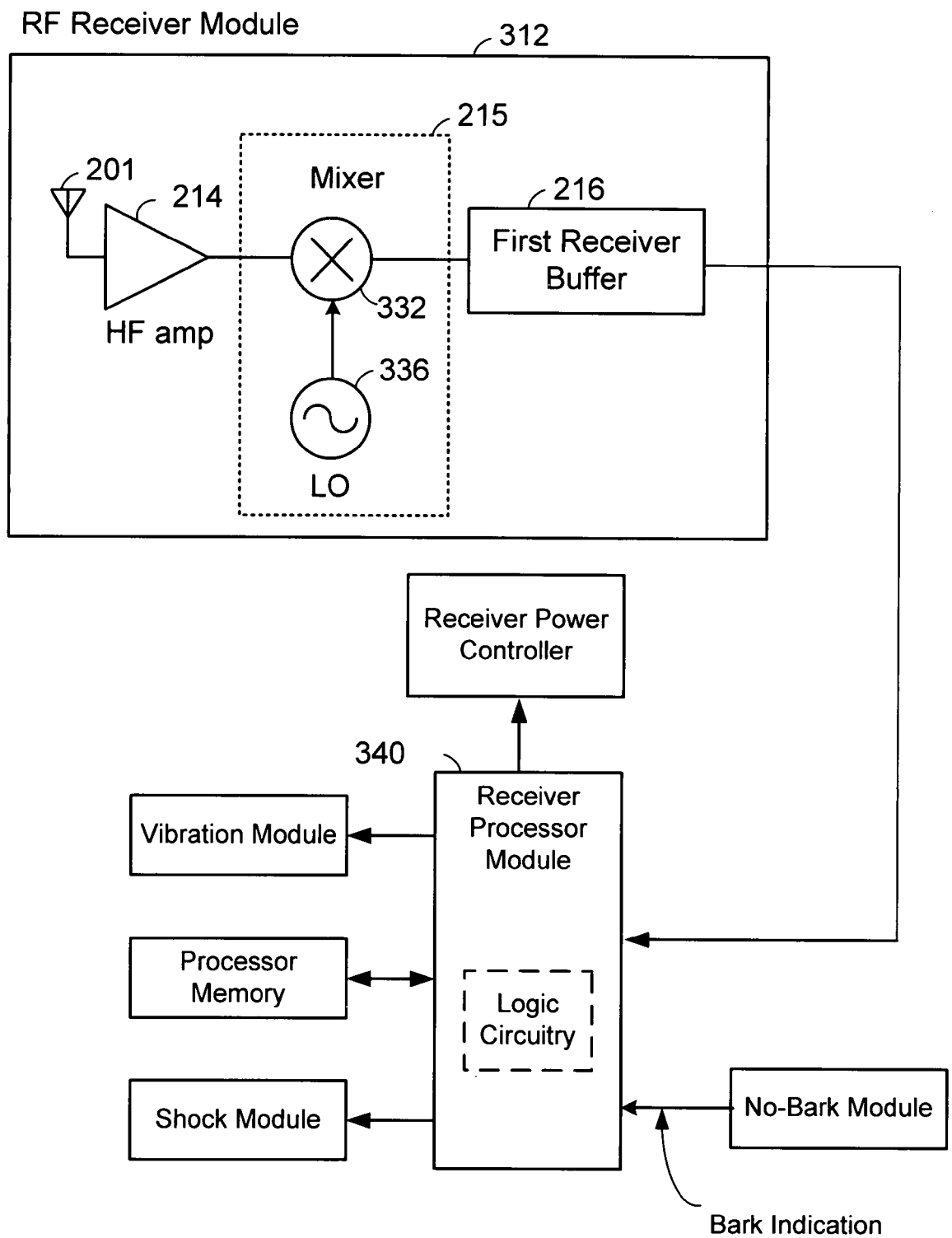
FIG. 7 is a functional schematic diagram of the wireless receiver module showing a detailed view of an RF receiver module.

FIG. 7 is a functional schematic diagram of a wireless receiver module 200 showing a detailed view of RF receiver module 312. The modulated RF signal is coupled to a high frequency (HF) amplifier 214 by receiving antenna 201. The modulated RF signal is amplified by a fixed gain by HF amplifier 214 and then coupled to a demodulator 215. Demodulator 215 comprises a mixer 332 and a local oscillator (LO) 336. LO 336, oscillating at the selected carrier frequency, is coupled to mixer 332 which separates the amplified modulated RF signal into the carrier frequency and the formatted transmission message. The formatted transmission message is coupled to a first buffer 216 wherein the formatted transmission message is formed into a digital signal suitable for interpretation by a receiver processor module 340. Receiver processor module 340 is operable to interpret control commands wirelessly received from RF receiver module 312 and to generate corresponding stimulation. In the described embodiment, the stimulation is one of shock or vibration.

Figure 8:
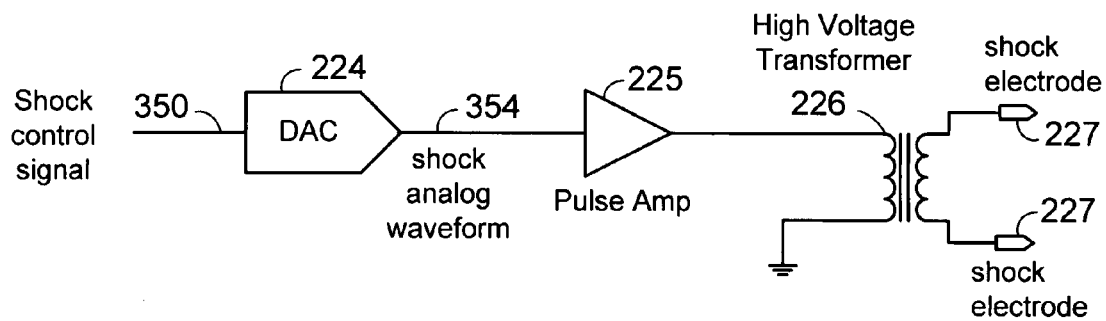
FIG. 8 is a detailed schematic diagram of a shock module.

FIG. 8 is a detailed schematic diagram of the shock module 316 of FIG. 6. When the stimulation mode is set to shock, receiver processor 304 (not shown) provides a shock control signal by way of line 350 to a digital-to-analog converter (DAC) 224, which converts the digital data into an analog shock waveform. The shock analog waveform, provided to a pulse amplifier 225 by way of line 354, is amplified to a predetermined level by pulse amplifier 225 before being coupled to a high voltage transformer 226. High voltage transformer 226 boosts the shock analog waveform to a level defined by the turns ratio of the transformer. The output of high voltage transformer 226 is coupled to shock electrodes 227 which couple the shock waveform to the animal.

Figure 9:
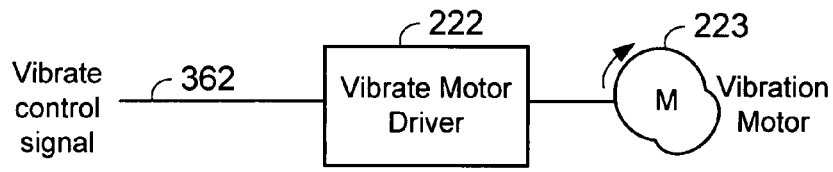
FIG. 9 is a detailed schematic diagram of a vibrate module.

FIG. 9 is a detailed schematic diagram of vibrate module 320. When the selected stimulation mode is vibrate, receiver processor module 304 (not shown) generates a vibrate control signal to a vibration motor driver 222 by way of line 362, which converts the digital vibrate control signal into a waveform suitable for driving vibration motor 223. As may be seen, vibration motor 223 includes a non-symmetrical shaped rotating head to generate a vibrating sensation.

Figure 10:
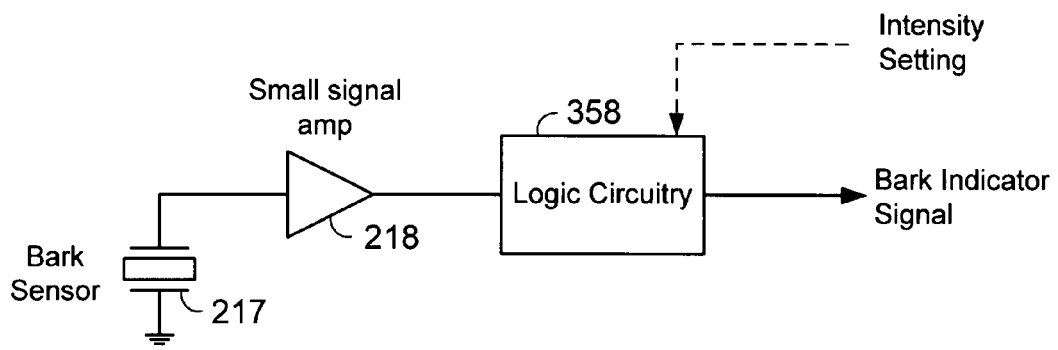
FIG. 10 is a detailed schematic diagram of a no-bark module.

FIG. 10 is a detailed schematic diagram of no-bark module 324. In the bark prevention mode, i.e., no-bark mode, bark sensor 217 generates a small signal responsive to the barking. As may be seen, the logic circuitry 358 is operable disposed to receive an intensity setting for the No-bark mode of operation. The intensity level may operably be set through an intensity level selection switch located at or associated with the receiver of a training system. In one embodiment, at least one of the Intensity Setting and an on/off mode selection is received wirelessly through a radio front end of the receiver of the training system and is provided to the logic circuitry for storing and use upon determining that the bark sensor has indicated that the dog has barked. A small signal amplifier 218 amplifies the small signal to produce an amplified small signal that can be converted to digital data by logic circuitry 358. In the present embodiment, logic circuitry 358 forms the amplified small signal into digital data for further processing by the receiver processor module. The no-bark mode, in the present embodiment, will generate a shock at the onset of barking. In an alternate embodiment, logic circuitry 358 can be programmed to allow a moderate amount of barking but will trigger an output once the barking crosses a predetermined threshold. Once triggered, logic circuitry 358 generates a bark indicator signal that is provided to the receiver processor module for further processing. Thus, in the alternate embodiment, a barking threshold is envisioned such that a programmable level of barking is allowable, but once that threshold is exceeded, the receiver processor module generates a shock. In other embodiments, any selected mode and intensity level may define a training response whenever barking is detected above the specified level.

Figure 11:
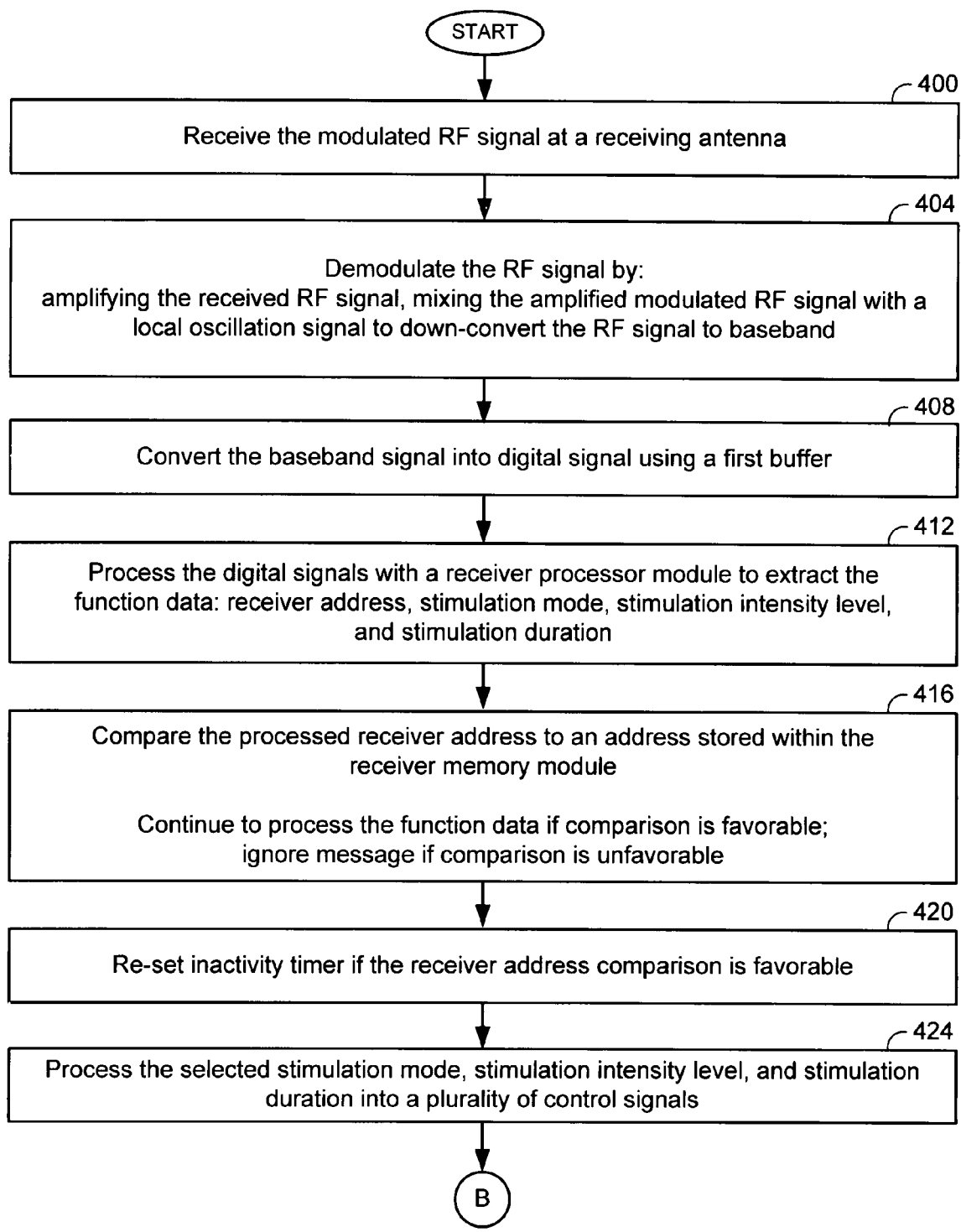
FIGS. 11 and 12 are flow charts of a receiver method.
Figure 12:
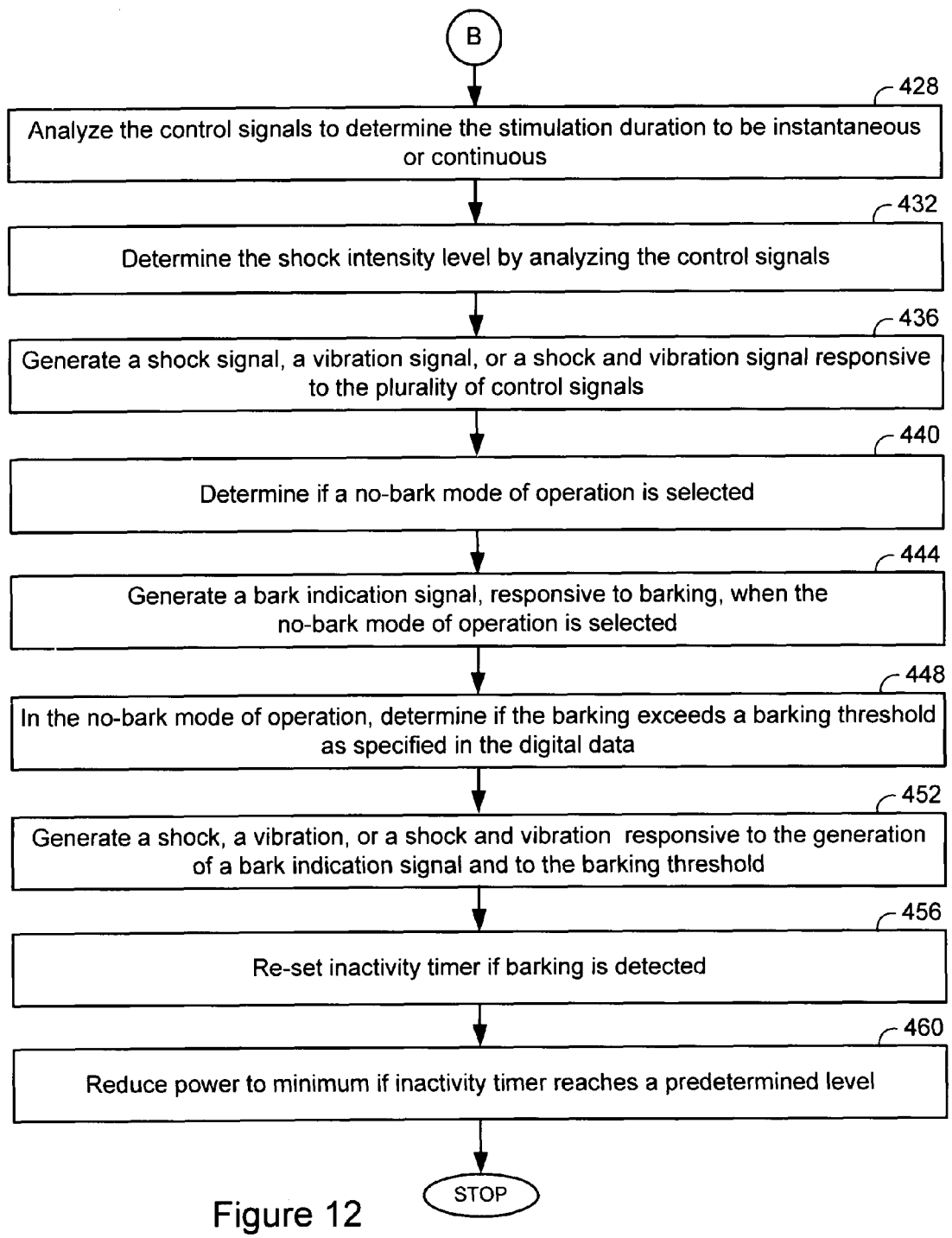

FIGS. 11 and 12 are flow charts of a receiver method. The transmitted modulated RF signal is received at a receiving antenna (step 400). The received signal is demodulated by amplifying and mixing the received RF signal with a local oscillation signal to down-convert the RF to baseband (step 404). A first buffer converts the baseband signal into digital signals suitable for processing by a receiver processor module (step 408). The receiver processor module extracts the function data (receiver address, stimulation mode, stimulation intensity level, and stimulation duration) from the digital signals (step 412). The receiver processor module compares the received receiver address to an address stored internally within the receiver memory module. If the comparison is favorable (i.e., the addresses are identical) the receiver processor module continues to process the function data. The rest of the function data is ignored if the comparison is unfavorable (step 416). An inactivity timer is re-set (set to zero) if the receiver address comparison is favorable (step 420).

After a favorable receiver address comparison, the receiver processor module continues to process the stimulation mode, stimulation intensity level, and stimulation duration to create a plurality of control signals (step 424). The method continues at FIG. 12 wherein the plurality of control signals are coupled to a shock module, a vibration module, and a no-bark module responsive to the commands transmitted from a wireless command module. The stimulation duration is determined to be instantaneous or continuous by analyzing a duration control signal (step 428). The shock intensity level is set according to the intensity control signal processed from the function data (step 432). The stimulation modules generate a shock, a vibration, or a shock and vibration responsive to the plurality of control signals received from the receiver processor (step 436).

The receiver processor also determines that a no-bark mode of operation is selected (step 440). When selected, the no-bark module generates a bark indication signal that is coupled to the receiver processor module (step 444). In the no-bark mode of operation, the receiver processor module determines if the bark indication signal exceeds a barking threshold as specified in the digital data (step 448). If the barking exceeds the barking threshold, the receiver processor module generates a shock signal, a vibration signal, or a shock and vibration signal to the simulation modules (step 452). In the no-bark mode, the inactivity timer is re-set upon the generation of the bark indication signal (step 456). Unless re-set by an activity indicating the stimulation module is in-use, the inactivity timer will continue to count up to a predetermined maximum value at which time it will signal the receiver processor module to turn the power controller off in order to save power (step 460)

Figure 13:
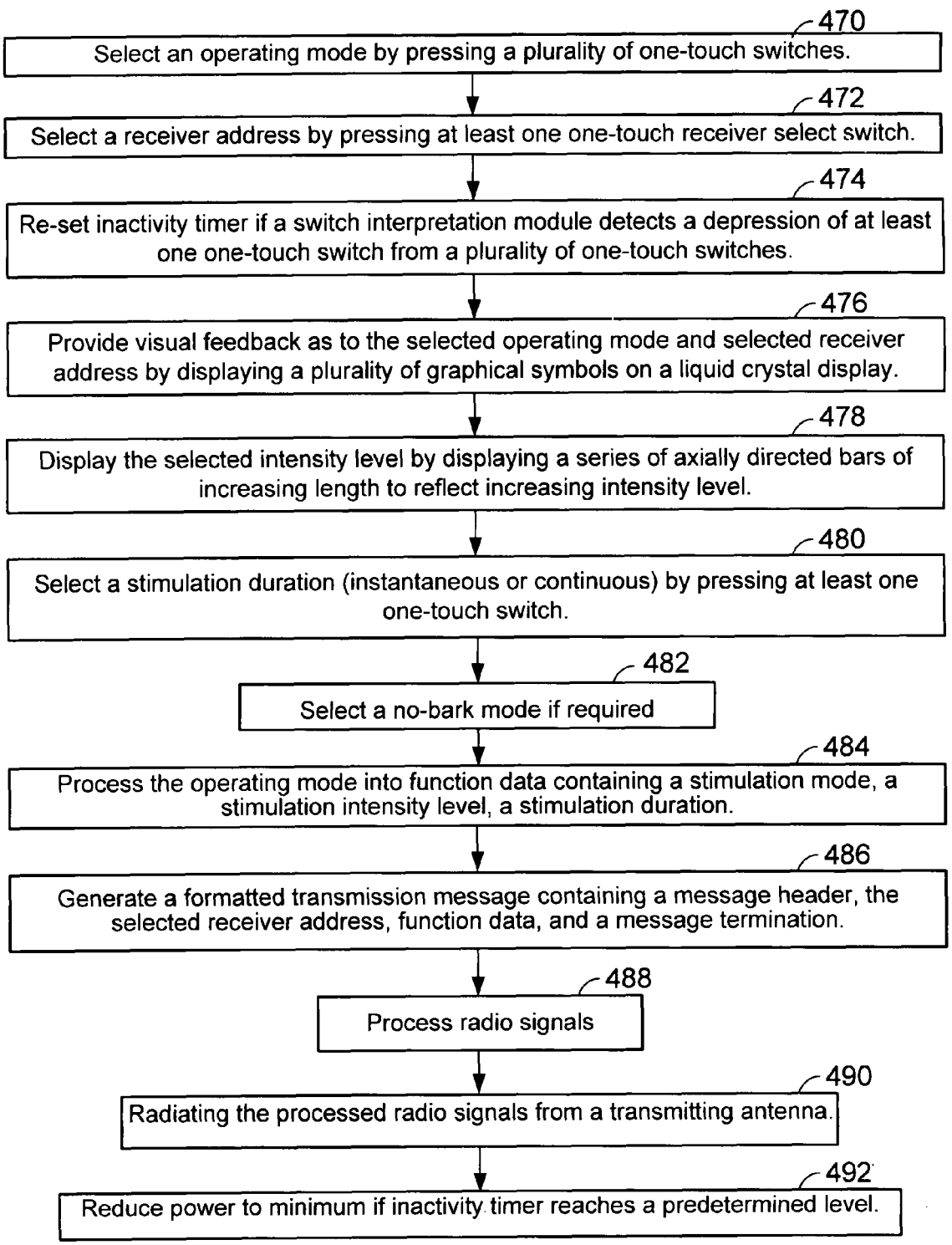
FIG. 13 is a transmitter method flow chart.

FIG. 13 is a transmitter method flow chart. The operating mode is determined by analyzing a plurality of one-touch switches (step 470). A receiver address is determined by analyzing the at least one one-touch switch (step 472). Each time a switch interpretation module detects a switch depression, an inactivity timer is re-set (step 474). Confirmation of the selected operating mode and receiver address is provided by displaying a plurality of graphical symbols on a liquid crystal display (step 476). The selected intensity level is shown on the liquid crystal display by displaying a series of axially directed bars of increasing length to reflect increasing intensity level (step 478).

A selected stimulation duration can be either instantaneous or continuous. The stimulation duration is determined by analyzing a plurality of one-touch switches (step 480). In the continuous mode the stimulation will continue as long as a "continuous" one-touch switch is pressed. The instantaneous mode will generate the stimulation for a predetermined period of time. An alternate training mode, a no-bark mode, provides a stimulation (shock, vibration, shock and vibration) whenever barking is detected. The no-bark mode is selected by pressing at least one one-touch switch (step 482).

The command processor module processes the selected operating modes into function data containing the selected stimulation mode, selected stimulation intensity level, and the selected stimulation duration (step 484). The command processor further processes the function data and the selected receiver address into a formatted transmission message containing a message header and a message termination (step 486). The formatted transmission message is processed into a radio signal (step 488) then transmitted for reception by the selected receiver. The method of processing the formatted transmission message into a radio signal comprises: mixing the formatted transmission message with a local oscillation signal operating at a selected RF frequency to create a modulated RF signal. The modulated RF signal is filtered by a filter module to remove signal components below and above the selected RF frequency. After amplification the processed radio signal is radiated from a transmitting antenna (step 490).

The command processor module monitors an inactivity timer that continuously increments when the command module is in an active state. Unless the inactivity timer is reset by the command processor, the inactivity will reach a predetermined level, at which time the command processor will generate a shut-down command that instructs the power controller to reduce system power to a minimum (step 492).

Figure 14:
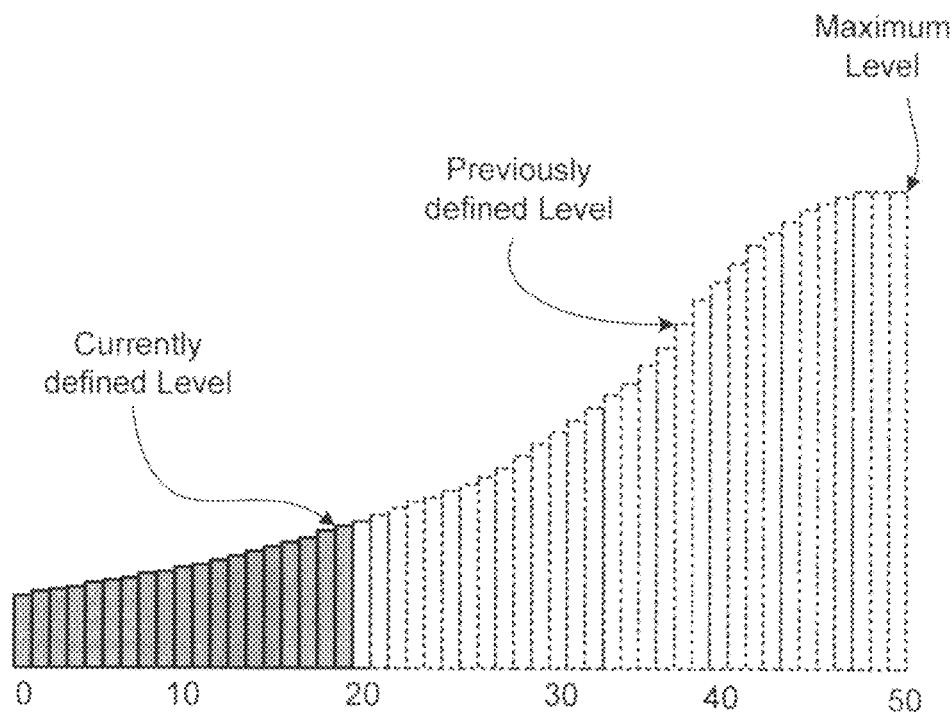
FIG. 14 illustrates a normal mode of operation.

FIG. 14 illustrates a normal mode of operation. The currently defined level is used to stimulate the animal and is based on the desired reaction of the animal to the selected stimulation. Generally this stimulation level is one that is an effective stimulation level for a dog and may be modified as necessary. For example, as a dog's responses improve and the dog becomes more attentive, a trainer may choose to reduce the stimulation level. Generally, though, the currently defined level is the level used for the routine training stimulation. A previously defined level is set less than or equal to the maximum level. One purpose of the previously defined level is for a Jump or Rise mode (in one embodiment) of operation as is described below in relation to FIG. 15. It should be noted that the graph of FIG. 14 illustrates a graphic display of a current level of stimulation. Thus, if the currently defined level is at the point indicated in FIG. 14, the transmitter transitions from no stimulation to stimulation at the level of intensity indicated by the currently defined level. FIG. 14 is not intended to represent that the intensity climbs from a low level to reach the currently defined level for Rise mode operation.

Figure 15:
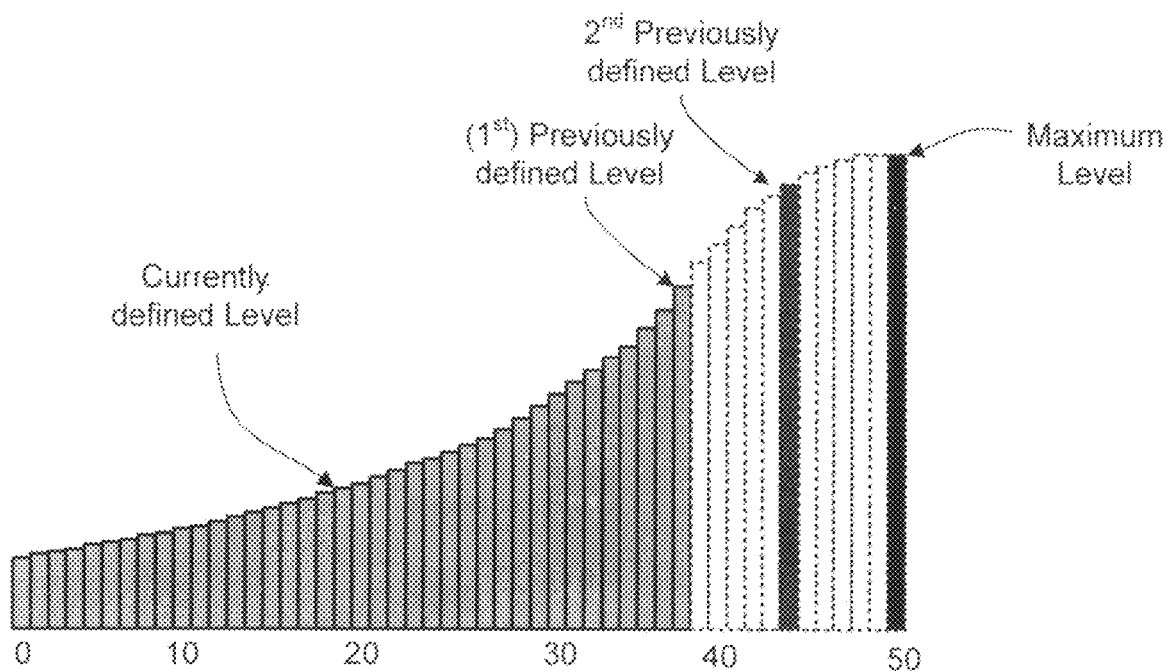
FIG. 15 illustrates Rise or Jump mode of operation.

FIG. 15 illustrates Rise or Jump mode of operation. In this mode, the trainer has selected a currently defined level and at least one previously defined level. Each previously defined level is less than the maximum level and is selected based on the determined reaction of the animal to a specified stimulation level. When the Rise mode is selected, the stimulation level steadily increases from the currently defined level. In one embodiment of the Rise level, the stimulation increases to the previously defined level having the highest intensity. Thus, in an embodiment as shown that includes first and second previously defined levels, the Rise mode intensity increases to a maximum level that is equal to the second previously defined level. If the user does not define the first and second previously defined levels, or if the unit does not allow definition of such levels, the stimulation level increases to a maximum (factory defined or design limited stimulation level). In a Jump mode of operation, the stimulation intensity initially jumps to the first and then to the second previously defined level for the first and then second depression of a Jump mode switch or button. Alternatively, a plurality of switches or button are provided to allow the user to choose between the first and second Jump mode intensity levels. Once the previously defined level or maximum level is reached, it will be maintained at that level until the Jump or Rise mode button is released in one embodiment.

In another embodiment, once the previously defined level is reached, that level is maintained for a finite period and then is reduced to a lower level (e.g., the starting level for the Rise feature). Once the Rise or Jump mode button is released, the stimulation level reverts back to level at which the system was operating prior to the Rise mode button being selected (the "currently defined level").

Figure 16:
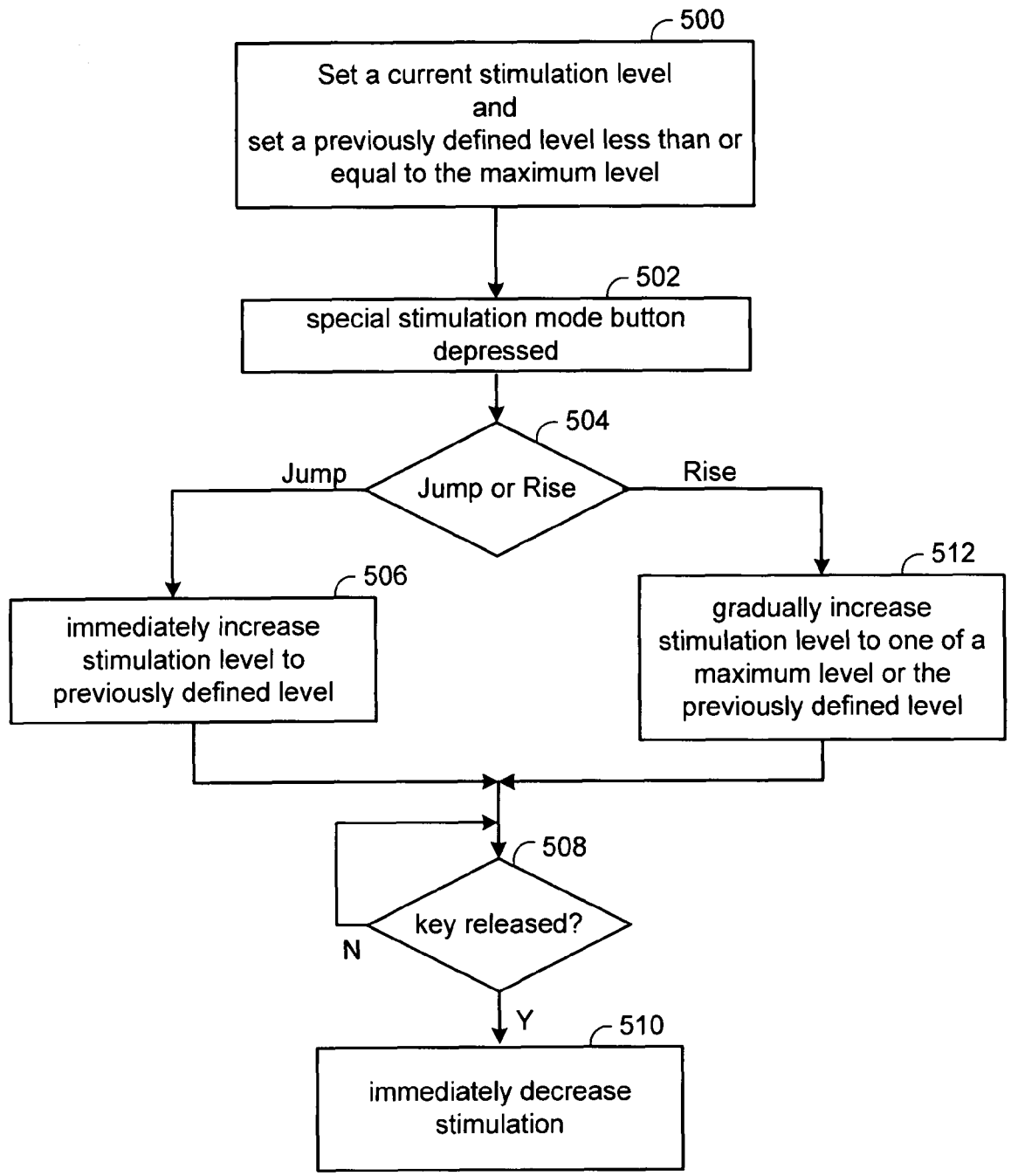
FIG. 16 is a flow chart of the Jump and Rise mode.

FIG. 16 is a flow chart of the Jump and Rise modes of operation. Initially, the method includes setting a current stimulation level and setting a previously defined level that is less than or equal to a maximum level (step 500). Thereafter, the method includes detecting that a special stimulation mode button was depressed (step 502) and determining whether the special stimulation mode button was a Jump mode button or a Rise mode button (step 504). If a Jump mode button was depressed, the method according to the embodiment of the invention, includes immediately increasing stimulation level to the previously defined level from the current stimulation level (step 506). Thereafter, the method includes determining if the special stimulation mode button has been released (step 508). Once it is determined that the button has been released, the method includes immediately decreasing the stimulation level to the currently defined level (step 510).

Referring back to step 504, if the Rise mode button is the special stimulation mode button that was depressed, the method according to the embodiment of the invention, includes gradually increasing the stimulation level to one of the maximum level or the previously defined level (step 512)

as long as the Rise mode button remains depressed as determined by step 508. Once the key is released, as determined in step 508, the stimulation is immediately decreased (step 510). If the stimulation level increases all the way to the maximum level or the previously defined level before the Rise mode button is released, then the maximum or previously defined level are maintained as long as the Rise mode button is depressed. Thereafter, operation of steps 508 and 510 are as described before in relation to the Jump mode button.

In an alternate approach to steps 508 and 510, the maximum level is maintained as long as the Jump or Rise mode is selected until expiration of a finite period. In one embodiment, the finite period is equal to a period that is based upon a random number. For example, the finite period may be equal to a specified period plus a random period. In one embodiment, the specified period is equal to five seconds and the random period ranges from zero to three seconds. Having a random duration is helpful to avoid predictability to keep the animal from learning that the stimulation ends after a specified period. As another aspect of the embodiment, the stimulation is not terminated, rather it is reduced to a specified value. The specified value may be a defined stimulation level for regular stimulation modes (in contrast to the special modes of Jump and Rise).

Figure 17:
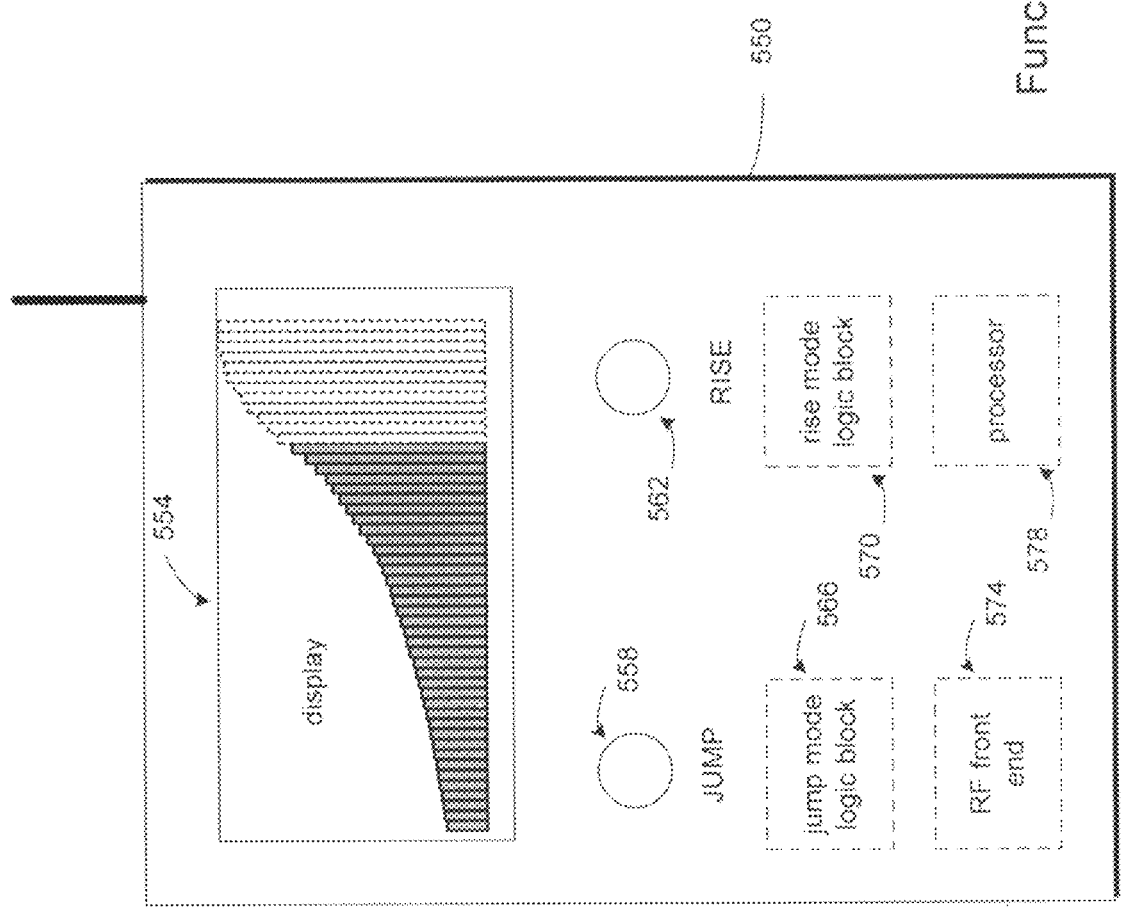
FIG. 17 is a functional block diagram of a handheld unit transmitter according to one embodiment of the invention.

FIG. 17 is a functional block diagram of a hand held transmitter unit for an animal training system according to one embodiment of the invention. As may be seen, the transmitter unit 550 includes a display 554 for indicating current stimulation level, a Jump mode button 558 for selecting the Jump mode of operation, a Rise mode button 562 for selecting a Rise mode of operation, as well as a plurality of circuit blocks 566-578 shown in dashed lines to indicate internal device elements that control the operation of the transmitter unit. Each of the circuit blocks may be formed as discrete state logic or circuit elements or by computer instructions stored in memory and executed by a processor. Thus, the circuit blocks 566-570 include logic blocks for the Jump mode of operation, the Rise mode of operation, and RF front end for upconverting an outgoing signal produced by the logic blocks or the processor to a radio frequency for wireless transmission and, of course, a processor block which control and defines operation of the transmitter unit.

If the any of the logic blocks or the processor block produces an output signal in a digital form, analog-to-digital conversion circuitry is included to enable the RF front end to up-convert an outgoing signal from a low frequency (either baseband or an intermediate frequency) to a radio frequency for wireless transmission. The RF front end may implement either a two-step process or a single step process for up-converting to RF. One of average skill in the art may readily determine particular RF front designs appropriate for the present application.

Figure 18:
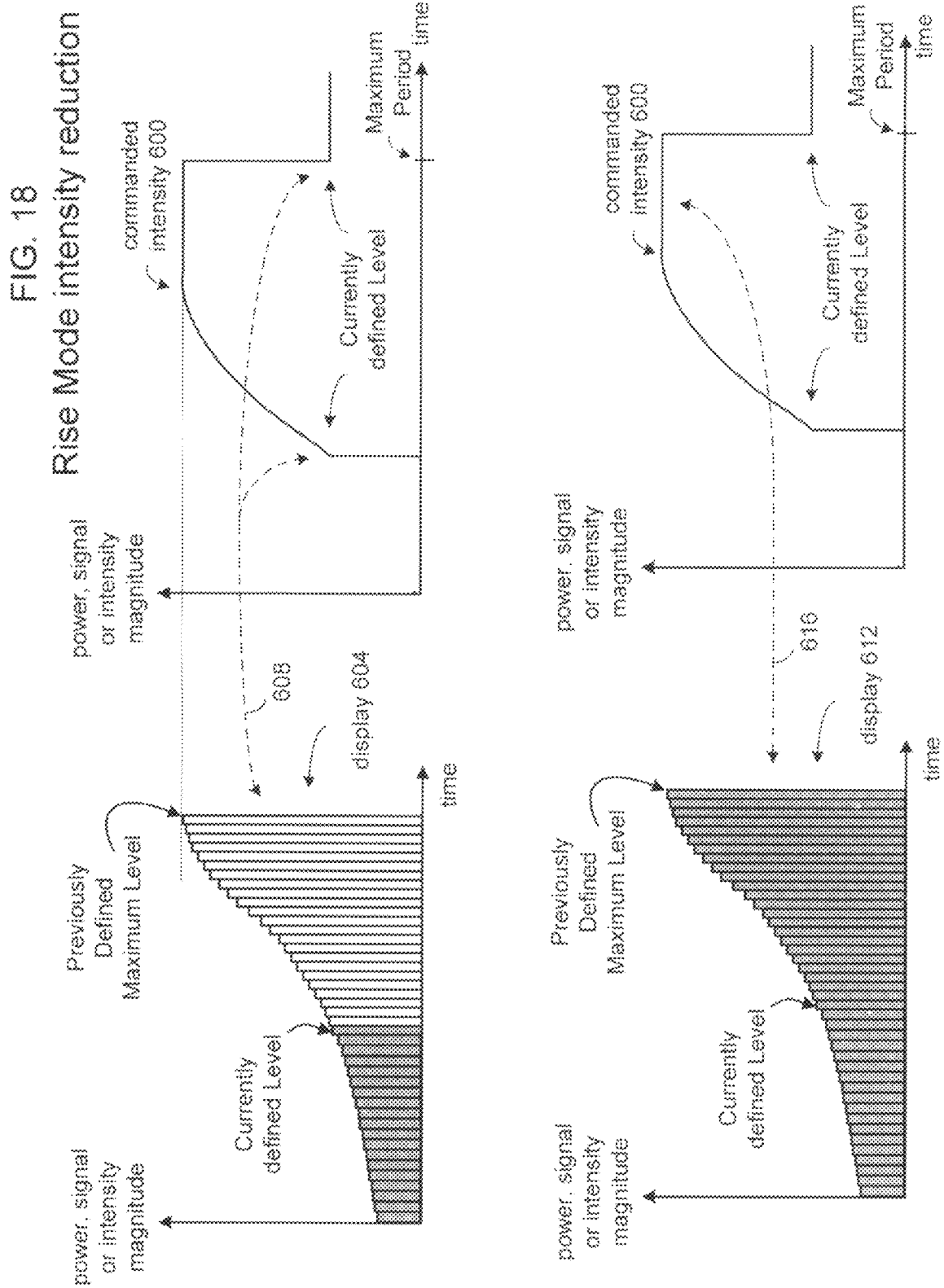
FIGS. 18 and 19 illustrate operation according two embodiments for Rise mode intensity reduction.

FIG. 18 is a plurality of diagrams that illustrate hand held controller displays in relation to transmitter commanded intensity curves that reflect operation of a controller according to one embodiment of the invention for the Rise mode of operation. Referring to FIG. 18, it may be seen that, upon depression of the Rise mode button, that the commanded intensity 600 of the stimulation increases from a currently defined level to a previously defined maximum level. The intensity may be commanded in any one of a plurality of different methods as will be described in greater detail in reference to at least one figure that follows. The left hand side of FIG. 18 illustrates the display, according to one embodiment of the invention, of the controller in relation to the commanded intensity shown on the right hand side of the Figure at the points identified by the dashed arrows. Upon an initial depression of the Rise Mode button, the commanded intensity is the currently defined level (for normal operation). This level of intensity and the corresponding display 604 is as shown by the dashed line 608. The commanded intensity then increases until the Rise Mode button is released or, as shown on the bottom left and bottom right diagrams, when the maximum level is reached. The display 612 illustrates a display when the commanded intensity 600 has reached the maximum level as indicated by dashed line 616.

The maximum level may be predefined by the user or within internal controller logic. In the described embodiment, the predefined maximum level defined by the user cannot exceed the maximum level defined with the internal controller logic and can only be set to a value that is less than or equal to the maximum level defined within the controller logic.

After a specified period of the stimulation being at the maximum level, the intensity drops down immediately at a single point to the currently defined level as is indicated by the two commanded intensity curves. This may be seen on the time line at "Maximum Period". Thus, when the Rise mode button is initially depressed, the display shows an intensity level that begins at the currently defined level. Thereafter, the displayed intensity level increases until a maximum intensity is reached. The display for the maximum intensity is the lower of the display graphs on the left hand side of the Figure (display 612). Once a maximum period has been reached for the commanded intensity, the intensity level drops to the currently defined level and the display of the upper left hand side of the Figure is displayed again.

Thus, the display gradually increases from the top display 604 to the bottom display 612 on the left hand side of the Figure from initial depression of the Rise mode button until the maximum commanded intensity is reached. From that point forward until a maximum period is reached, display 612 is seen. After the maximum period is reached, though, for the commanded intensity, the display instantly reverts from the bottom left hand display to the upper left hand display since, as shown on the right hand side, the commanded intensity drops instantly.

Figure 19:
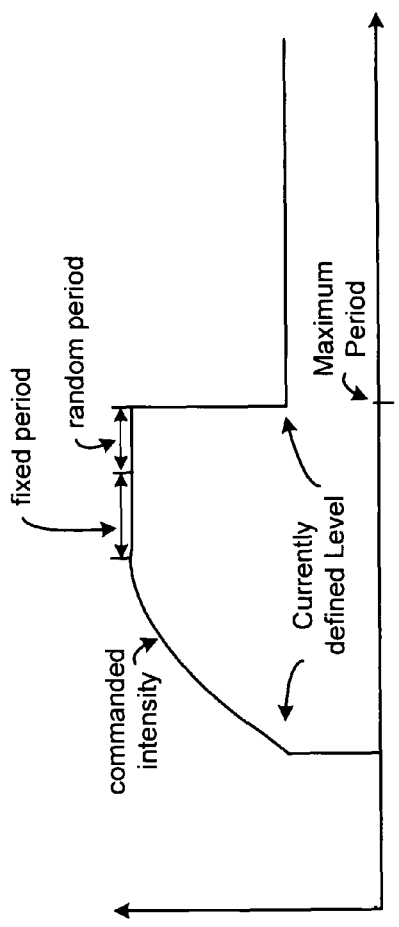

FIG. 19 illustrates an embodiment in which the commanded intensity has a maximum period for maximum intensity that is a function of the sum of a fixed period and a random period. The maximum period thus has a random duration. Operation of such a random period is as described elsewhere here in this specification.

While FIGS. 18 and 19 illustrate the graphics displays and corresponding commanded intensity curves, it should be understood that the controller includes the logic to reduce the intensity to operate in the manner that is reflected for the commanded intensity displays (for example, the two curves on the right hand side of FIG. 18). Also, while the described embodiment illustrates that the controller drops the intensity down to the currently defined level (which is defined or selected by the user, it should be understood that the intensity may drop to a different lower level to prevent over stimulation of the pet.

As may be seen from examining FIGS. 18 and 19, the stimulation is shown to initially start at a currently defined level prior to increasing whenever the Rise Mode button is depressed. Thus, it may be assumed that a traditional stimulation mode of operation is being used to stimulate the pet at a currently defined level (defined by the user) until a switch is depressed to trigger the "rise" operation in which the stimulation increases to a maximum level (defined within internal controller logic or by the user). If a user were to merely initiate the stimulation in the "rise" mode, then the beginning portion of the total stimulation starts at the currently defined level and increases to the maximum level. This operation is shown, for example, in FIGS. 14 and 15.

Figure 20:
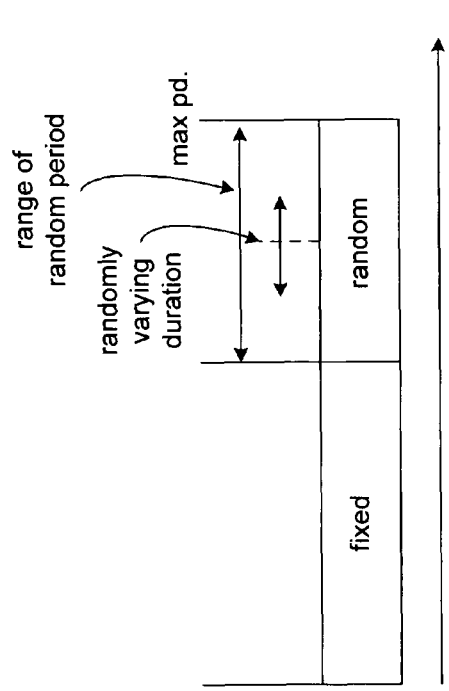
FIG. 20 is a timing diagram that illustrates operation of a random maximum stimulation period according to one embodiment of the invention.

FIG. 20 is a timing diagram that illustrates operation of a random maximum stimulation period. This diagram is operable for any mode that reaches a maximum stimulation amount whether that maximum amount is specified within the controller or by the user. Generally, once a maximum intensity is reached, the intensity is allowed to continue for the sum of a fixed period and a random period.

Referring back to FIG. 19, it may be seen that, upon depression of the Rise mode button, that the commanded intensity of the stimulation increases from a currently defined level to a maximum level. The maximum level may be predefined by the user or within internal controller logic. In the described embodiment, the maximum level defined by the user cannot exceed the maximum level defined with the internal controller logic and can only be set to a value that is less than or equal to the maximum level defined within the controller logic. After a specified period of the commanded stimulation being at the maximum level, the intensity drops down immediately to the currently defined level. Here, however, the maximum period is a period that comprises two portions. A first portion is a fixed period that is followed by a second portion that is defined as a period having a random length (as also shown in FIG. 20). Thus, the total maximum period is random in duration.

One benefit of having a random duration of stimulation is that it becomes more difficult for the animal to acclimate to maximum stimulation of a fixed length. For one example, a fixed period may be set to five seconds and the random period may vary from zero to three seconds. Thus, the total maximum period for stimulation randomly ranges from five to eight seconds in the described embodiment of the invention. A controller thus includes logic to begin a timer and to calculate a random period for the duration of maximum intensity of stimulation. If the user has not released a trigger or button activating the stimulation by the end of the random period, the level of stimulation is dropped. In the example shown, the stimulation level is dropped to the currently defined level for stimulation. Alternatively, stimulation level may be dropped gradually and/or may be dropped to a level different that the currently defined level.

Figure 21:
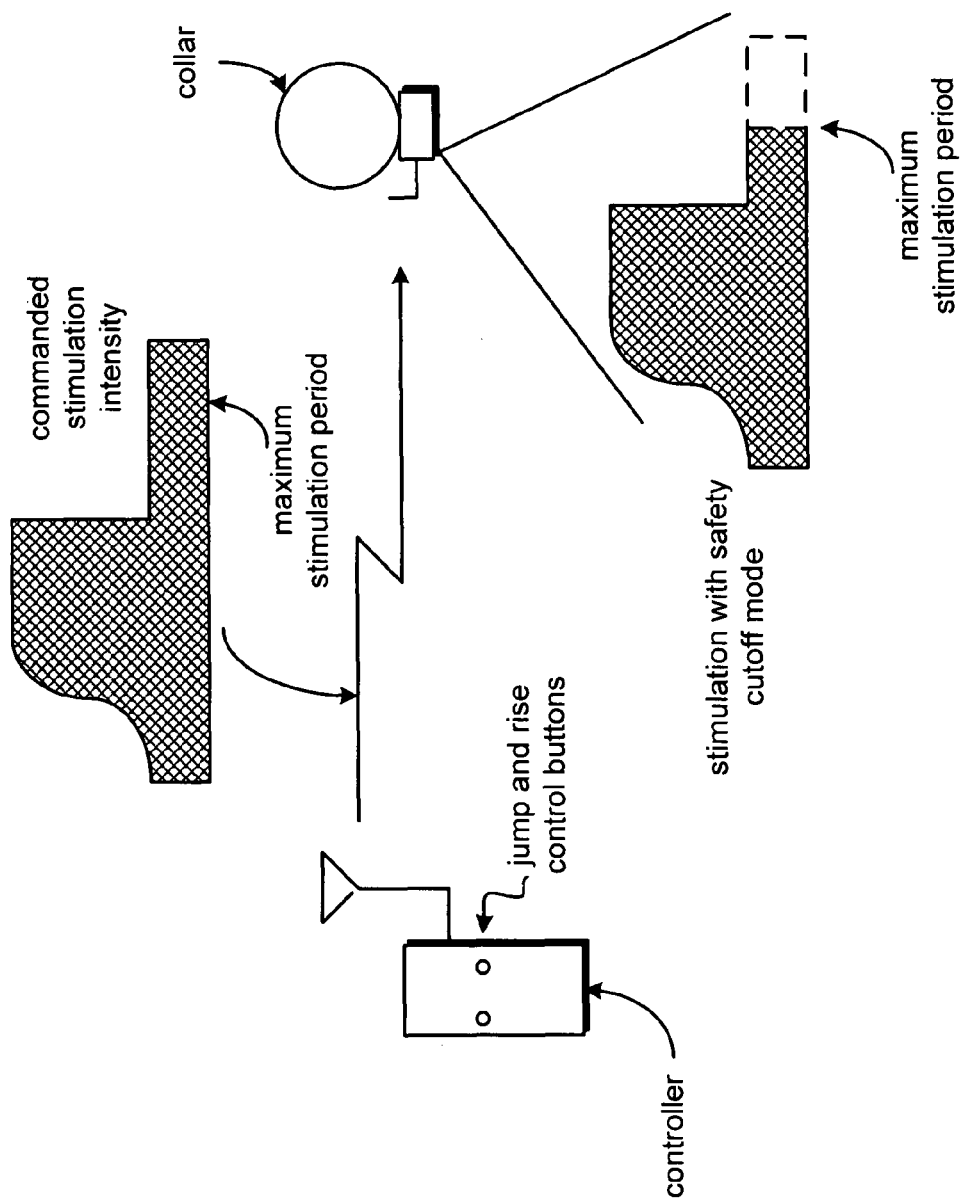
FIG. 21 illustrates a system that includes a receiver with a receiver safety mode according to one embodiment of the invention.

FIG. 21 is a functional block diagram of a dog training system that illustrates an embodiment of the invention in which a receiver has an additional safety feature according to one embodiment of the invention. Specifically, a receiver has a receiver safety mode that limits total stimulation to a specified period. Thus, regardless of the controller logic and operation, the receiver is operable to track a total stimulation time and to terminate stimulation once a defined period has been reached. As may be seen, the controller is generating a continuous stimulation command that exceeds a maximum stimulation period defined within the receiver. Thus, as shown at the receiver end, the output stimulation is terminated at the end of the maximum stimulation period.

This defined period may be specified by the user or within factory defined logic within the receiver. In one embodiment, the receiver utilizes a jump connector within the device casing to enable a user to select the maximum period. In another embodiment, a set of dip switches are used within the device casing to select a maximum period of stimulation. Thus, even if a controller generates control commands to stimulate that exceed the specified maximum period, the receiver is operable to terminate stimulation once the defined maximum period has been reached.

In one embodiment of the invention, the receiver terminates stimulation until a new (different) control command for stimulating the animal. In another embodiment, the receiver waits a specified period (e.g., two to four seconds) after terminating stimulation before it allows stimulation to resume and does not rely on the control command being a new control command (resulting from a new depression of a switch that triggers the generation of a stimulation command). The timer for determining when the maximum stimulation period has been exceeded may be a digital clock or may be an analog timer device that generates a signal with a specified rise or fall period that used to define a maximum stimulation period.

One aspect of the embodiments of FIGS. 14, 15, 18, 19, 20 and 21 is that the intensity level relates to a plurality of different types of intensity. For example, intensity may be a function of current administered to the animal. Alternatively, intensity may be a function of the power of the signal produced to the animal. In yet another embodiment, intensity may be an indication of an average level of stimulation over a given window of time or period. For example, intensity may be increased by increasing a number of constant magnitude pulses in a specified period thus increasing the average amount of stimulation in that period. The display on the controller would thus reflect an increase in the average value of stimulation. In yet another embodiment, the intensity actually reflects a voltage level of the stimulation being applied to the animal.

Figure 22:
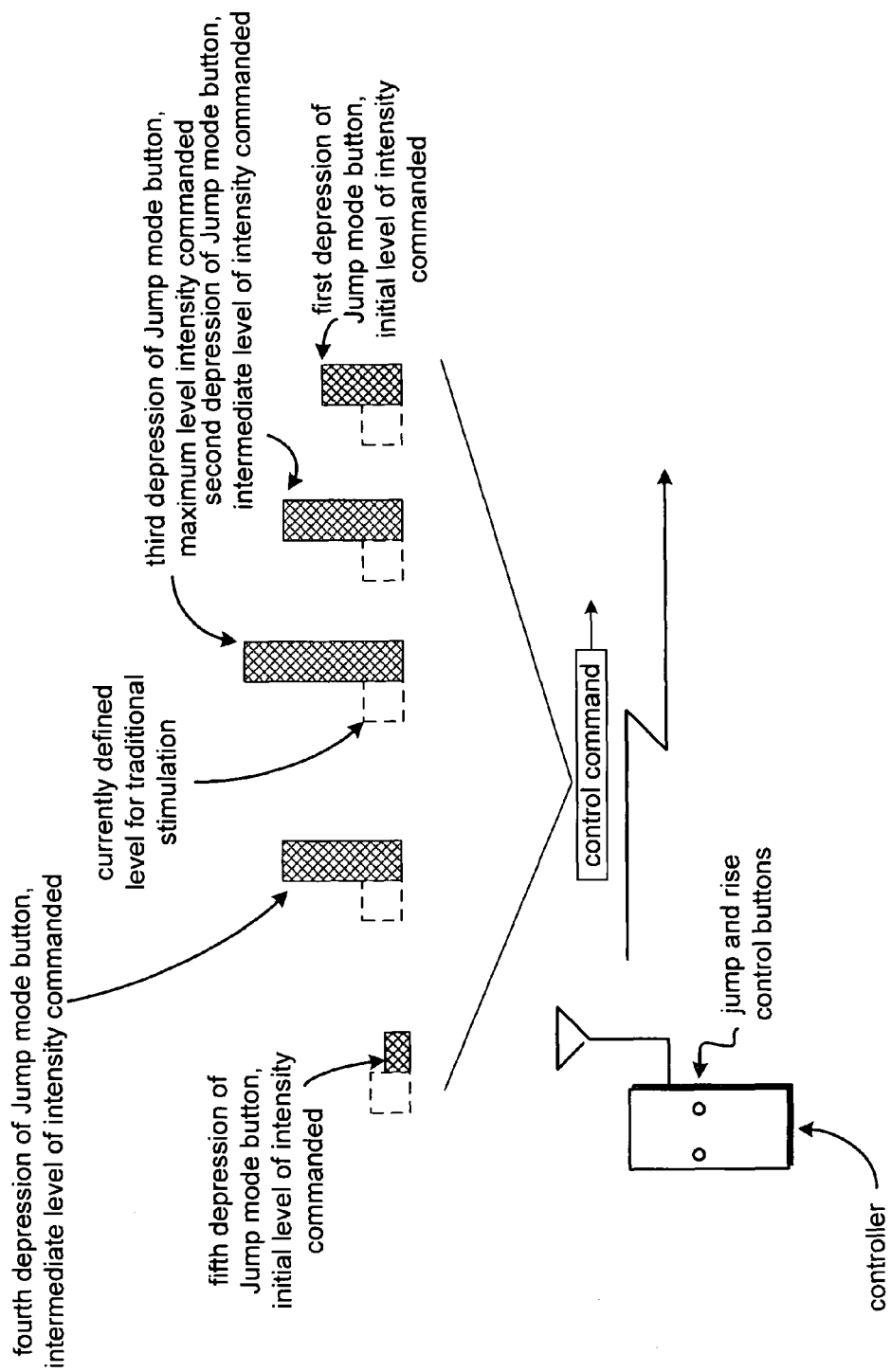
FIG. 22 is a functional diagram that illustrates a Jump mode according to an alternate embodiment of the invention.
Figure 23:
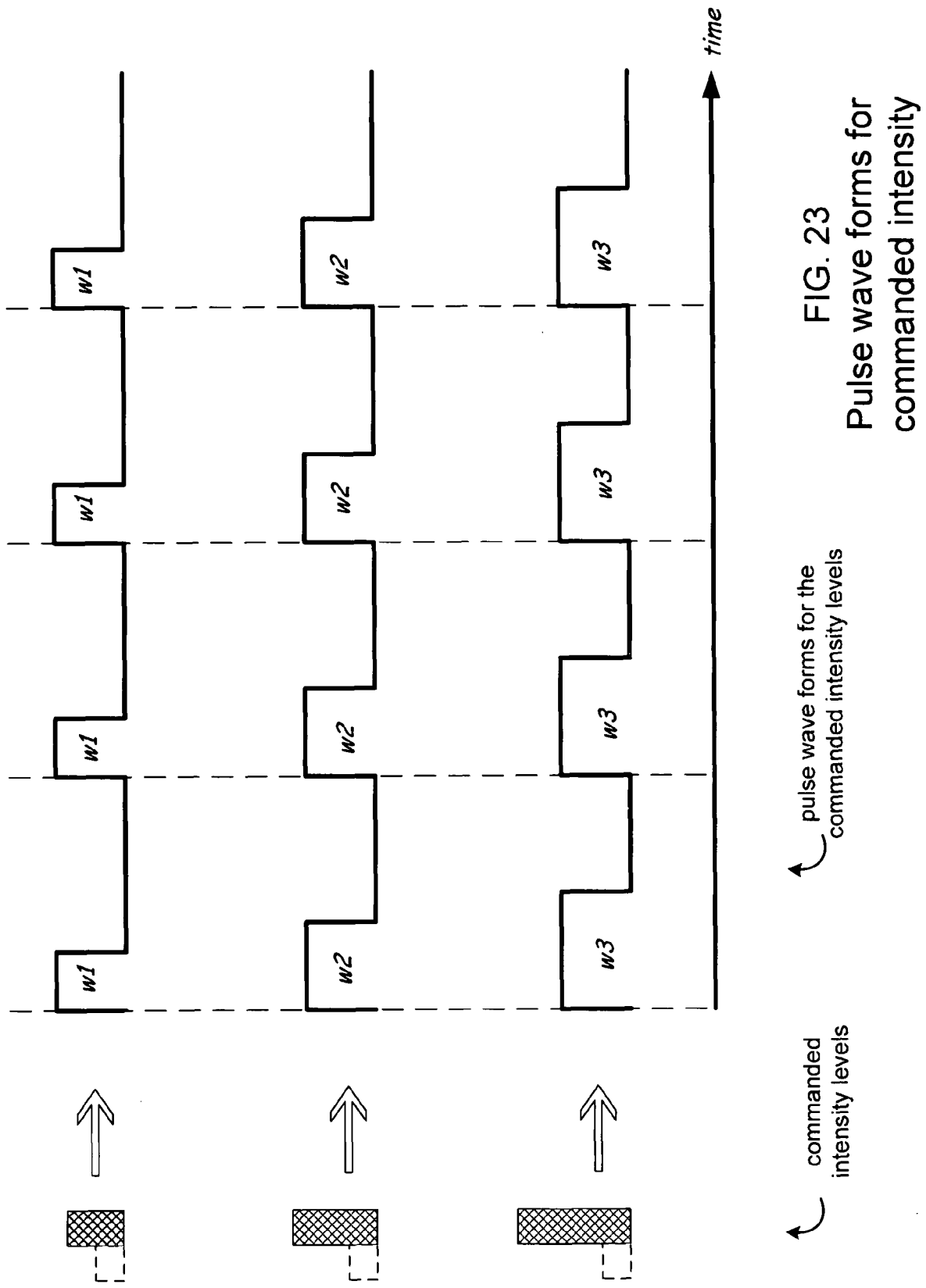
FIG. 23 is a timing diagram illustrating operation according to one embodiment.

FIG. 22 is a functional diagram that illustrates a Jump mode according to an alternate embodiment of the invention. Generally, a controller is operable to generate a control command each time a switch is activated to reflect a stimulation level. Thus, FIG. 22 represents operation in which a "Jump" mode switch has been depressed a plurality of separate times. According to the embodiment of the invention whose operation is reflected in FIG. 22, subsequent depressions of the Jump mode switch (or button) within a specified window of time results in the controller specifying different intensity levels for the different depressions of the Jump mode switch. Generally, the embodiment of the invention includes defining a plurality of Jump mode steps between the currently defined stimulation level and a maximum stimulation level. FIG. 23 is a timing diagram illustrating operation according to one embodiment. In the embodiment shown in FIG. 23, six different stimulation levels are shown. First, the controller generates stimulation levels that are equal to the currently defined level. Upon determining the Jump mode switch has been depressed, the controller changes the stimulation to a first intensity level in response to the first depression of the Jump mode button.

Upon determining that the Jump mode switch has been depressed a second time within a specified window of time, the controller changes the stimulation to a second intensity level. Upon determining that the Jump mode switch has been depressed a third time within a specified window of time, the controller changes the stimulation to a third intensity level. Similarly, the controller changes the stimulation to fourth and fifth levels for fourth and fifth depressions of the Jump mode button within a specified period. Further, as may be seen, some changes in intensity are increases in intensity while others are decreases in intensity. Generally, in one embodiment, Jump mode intensity levels may be user defined and need not be in the order shown. For example, the intensity shown for the fifth depression may be associated with the first depression. Further, this intensity level illustrates a decreased intensity level in relation to the currently defined level for traditional stimulation. Further, a different number of Jump mode steps may be implemented.

Referring back to the example of FIG. 22, in the described embodiment, the third intensity level is the maximum intensity level whether that maximum intensity level was defined by the user or within logic defined by the manufacturer of the controller. One aspect of the embodiment of FIG. 22 is that a new switch depression is required for a change in stimulation intensity level to be commanded in the control command by the controller. This aspect was also shown in FIG. 15 and described in relation to FIG. 15.

The timing diagram of FIG. 23 generally illustrates a method for generating pulses to command a specified intensity level according to one embodiment of the invention wherein intensity is commanded by pulse width. As may be seen in FIG. 23, a left portion of the Figure illustrates graphical representations of increased intensity levels. These increased intensity levels may be reached gradually through a Rise mode of operation or instantly through a Jump mode of operation. Going from top to bottom on the left hand side, it may be seen that three levels of intensity are shown. The right hand side illustrates an embodiment of the present invention for generating a control command that results in a corresponding intensity. As may be seen, a constant number of pulses are transmitted in a specified period. The commanded intensity, therefore, is based upon the pulse width of each of the constant number of pulses. A wider pulse is sent to represent a longer duration of stimulation to increase the amount of stimulation.

Figure 24:
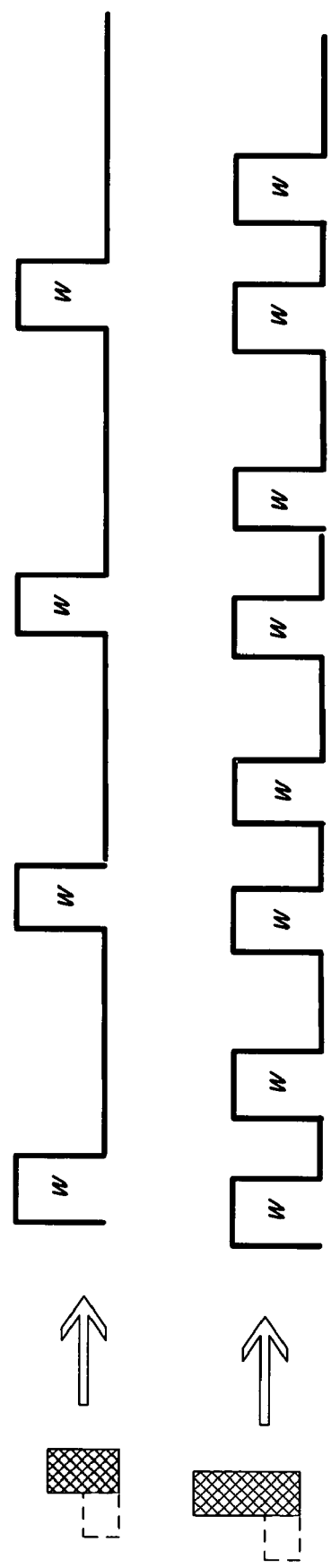
FIG. 24 is a timing diagram that illustrates an alternate approach to increasing stimulation.
Figure 25:
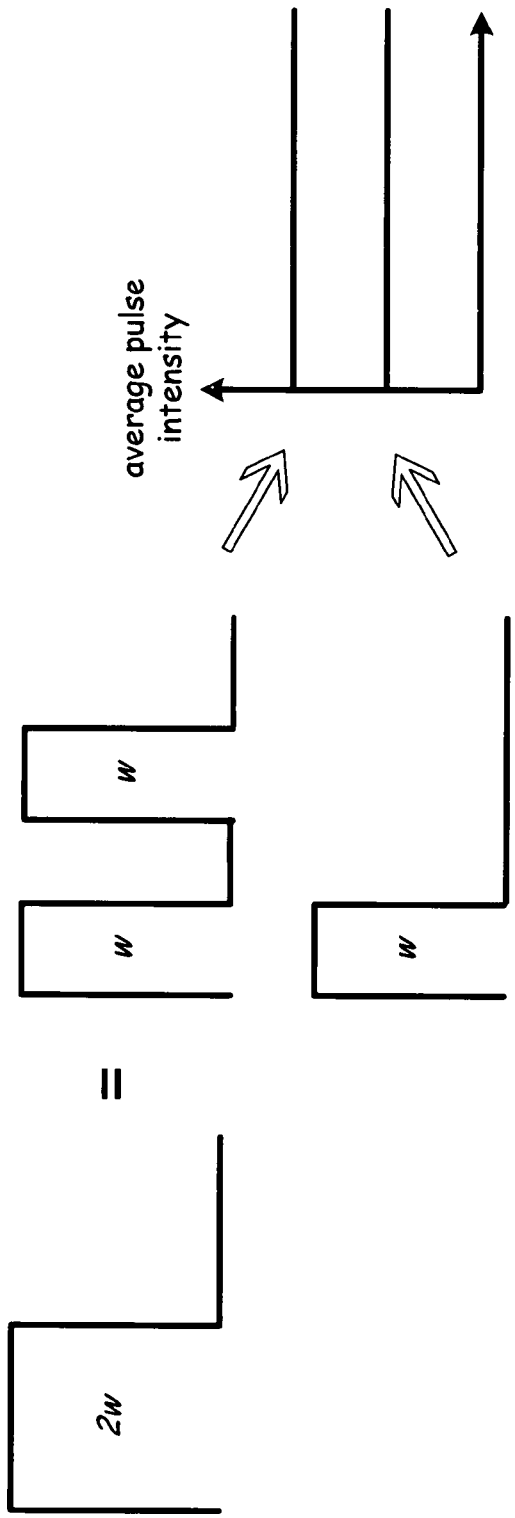
FIG. 25 is a timing diagram that illustrates a comparison of the two approaches of FIGS. 23 and 24.

FIG. 24 is a timing diagram that illustrates an alternate approach to increasing stimulation. Generally, the pulses all have a fixed width. To increase stimulation levels, a controller merely generates an increased number of pulses. FIG. 25, therefore, is a timing diagram that illustrates a comparison of the two approaches of FIGS. 23 and 24. A single pulse of width "w" generates an average stimulation level over a fixed period shown by the lower line of the graph for average pulse intensity. A single pulse of width "2w" generates an average stimulation level that is twice that of the single pulse having width "w" and the same average stimulation as is generated by two pulses of width "w" within a specified period. Thus, for whole increments of a desired stimulation level, the two approaches yield the same result because equal areas under the pulse curves are realized within the specified period. The approach of increasing the pulse width to represent increased stimulation level is advantageous, however, because it allows for intensity levels to be changed in a continuous form instead of a discrete form because the total pulse width may be changed at a continuous rate instead of at discrete steps (which happens by merely sending more pulses).

Figure 26:
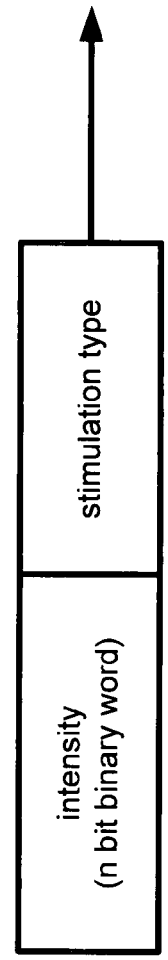
FIG. 26 is a signal diagram that illustrates an embodiment of delivering stimulation control information to a receiver by a controller according to one embodiment of the invention.

FIG. 26 is a signal diagram that illustrates an embodiment of delivering stimulation control information to a receiver by a controller according to one embodiment of the invention. As may be seen, a signal is transmitted that includes a signal portion for carrying a specified intensity level and a signal portion for specifying a stimulation type. FIGS. 27 and 28 illustrate alternate embodiments of controllers. As may be seen in FIG. 27, a numeric display may be used to provide feedback to the user to indicate a stimulation intensity level. FIG. 28 illustrates a controller that uses light emitting diodes shown generally at 804 to indicate intensity as shown generally at 808.

FIG. 29 is a curve that illustrates an alternate embodiment for operation of the Rise mode in which the commanded intensity is gradually decreased. As may be seen, starting from the currently defined level, the commanded intensity decreases as long as the Rise mode button is depressed. In one embodiment, a directional switch is provided for use in relation to the Rise mode. In another embodiment, a pair of buttons are provided for the Rise mode; one button is for increasing stimulation and one button is for decreasing stimulation. In either embodiment, the commanded stimulation is decreased to one of zero or a defined minimum amount.

Figure 30:
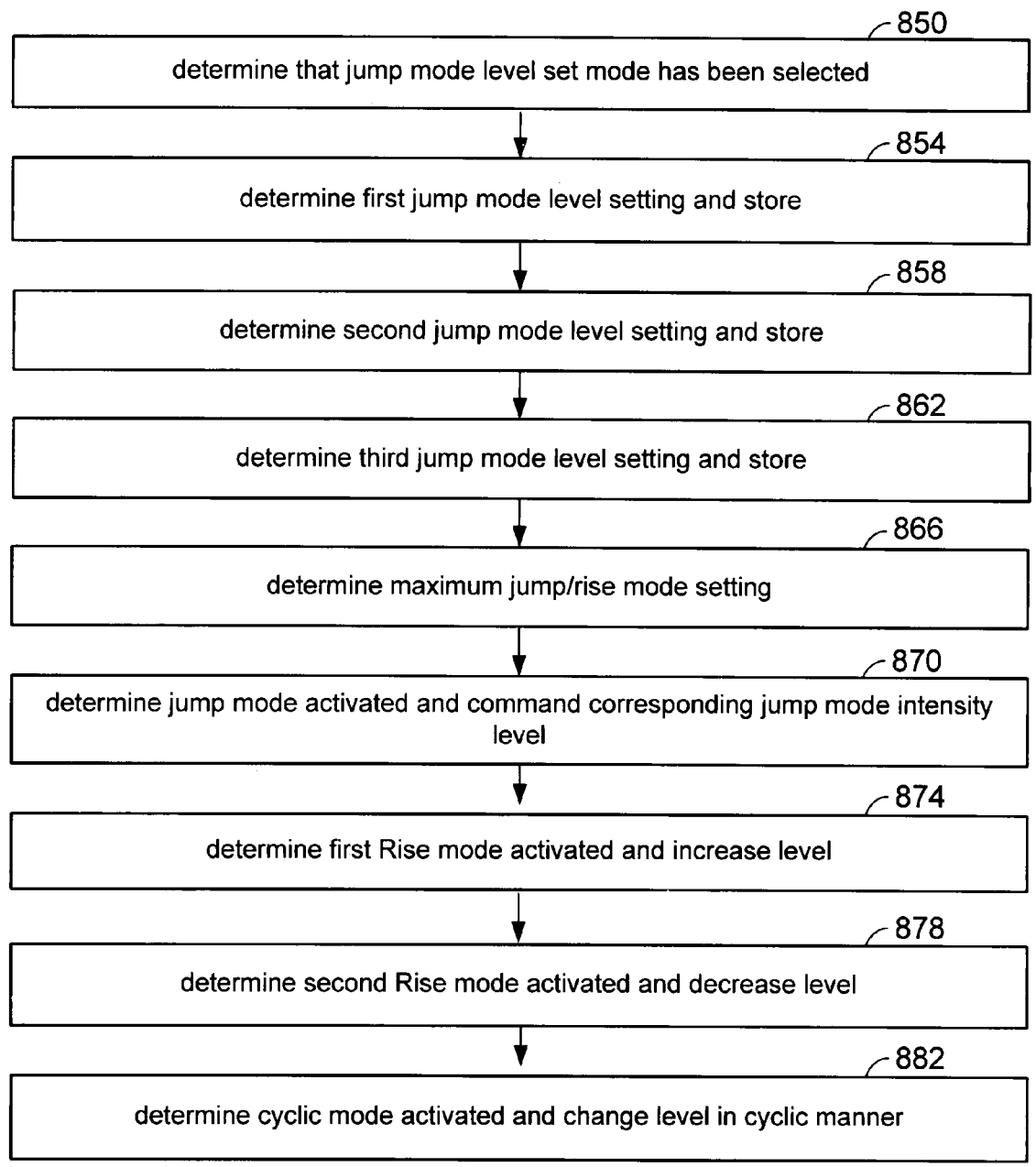
FIG. 30 is a flow chart illustrating a method according to one embodiment of the invention.

FIG. 30 is a flow chart illustrating a method according to one embodiment of the invention. The method generally includes programming the controller and subsequently activating the controller according to permanently defined modes and user selected modes. The first step includes determining that a jump mode level setting mode has been selected (step 850). Generally, a controller will have a key or sequence of key depressions that allow the controller to determine that a user wishes to program Jump mode operational parameters including, but not limited to, intensity levels for the Jump mode. In one embodiment of the invention, a controller has only one Jump mode level setting that may be programmed. In a different embodiment, a plurality of Jump mode intensity levels may be entered by the user. Moreover, the Jump mode intensity levels may be less or more than the "currently defined level" for Normal mode operations (stimulation) or any combination thereof.

Subsequently, the method includes determining first jump mode level setting selected or entry by the user and storing the first jump mode level setting (step 854). At least one embodiment further includes determining the entry or selection of a second jump mode level setting and storing (step 858) and determining a third jump mode level setting and storing (step 862). The method further includes determining a maximum Jump or Rise mode setting and storing (step 866).

After the above programming steps are completed and the controller is no longer in a programming mode, the method includes determining that the Jump mode has been activated and commanding a corresponding jump mode intensity level (step 870). Alternatively, or additionally, the method includes determining that a first Rise mode has been selected or activated and, responsive thereto, increasing the intensity level (step 874). Alternatively, the method includes determining that a second Rise mode has been activated and decreasing the intensity level (step 878). Optionally, the method also includes determining that a cyclic mode has been activated and changing the level in cyclic manner (step 882). For example, a cyclic mode is similar to the Rise mode except that the stimulation intensity cycles between rising and falling (in a sinusoidal manner).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A transmitter module for an animal behavior modification system, comprising:
radio front end circuitry configured for transmitting wireless commands to a receiver of the animal behavior modification system; circuitry configured for selecting a Rise mode of operation; a jump button configured for activating a Jump mode of operation; wherein the transmitter module is configured to: gradually increase a stimulation level to one of a previously defined level or to a maximum level that is defined within permanent memory of the transmitter module as long as Rise mode remains selected; increase a stimulation level to one of a previously specified first higher level when a jump button is depressed; increase the stimulation level to a previously specified second higher level when the jump button is depressed a subsequent time; and wherein the transmitter module is operable to change the stimulation level to a previously selected stimulation level after expiration of a finite period.

2. The transmitter module of claim 1 wherein the finite period has a random duration.

3. The transmitter of claim 1 wherein the maximum level is one of a maximum level of the animal behavior modification system or a previously defined level specified by the user.

4. The transmitter of claim 1 wherein the intensity of the stimulation level is increased by increasing at least one of a number of stimulation pulses in a specified period, a duration of the stimulation pulses, a commanded pulse voltage magnitude, a power level or, a current level.

5. The transmitter of claim 1 wherein the intensity of the stimulation level is specified by increasing at least one of a number of stimulation pulses sent in a specified period, by increasing a duration of a the stimulation pulses, by specifying a numerical stimulation level in a control command.

6. A transmitter module for an animal behavior modification system, comprising:
 a stimulation switch;
 a Rise mode button;
 a Jump mode button;
 radio front end circuitry for transmitting wireless commands to a receiver of the animal behavior modification system; and
 circuitry for determining a stimulation level and for transmitting a determined stimulation level to a receiver of the animal modification system;
 wherein the transmitter module is configured to operate in a normal mode wherein a user selected intensity stimulation level is commanded while the stimulation switch remains depressed, and operates in a Rise mode wherein stimulation levels are changed in a substantially continuous mode when the Rise mode button is depressed, and to operates in a Jump mode wherein stimulation levels are changed in by notable discrete levels when the Jump mode button is depressed.

7. The transmitter module of claim 6 wherein the transmitter is operable to change a pulse width in a continuous manner to change stimulation in a continuous manner in a Rise mode of operation.

8. The transmitter module of claim 6 wherein the transmitter is operable to change the pulse width in discrete sizes to change stimulation in discrete steps in a Jump mode of operation.

9. The transmitter module of claim 8 wherein the transmitter specifies a desired intensity level by generating a corresponding number of pulses in a specified period.

10. The transmitter module of claim 8 wherein the transmitter specifies a desired intensity level by generating pulses having a pulse width that corresponds to the desired intensity level.

11. The transmitter module of claim 8 wherein the transmitter specifies a desired intensity level by generating a control signal that numerically specifies the desired intensity level.

12. A method for a transmitter module for an animal behavior modification system, comprising:
 transmitting wireless commands to a receiver of the animal behavior modification system;
 selecting a Rise mode of operation;
 gradually changing a stimulation level to one of a previously defined level or to a maximum level that is defined within memory of the transmitter module as long as the Rise mode remains selected;
 increasing the stimulation level to a previously specified higher level when a jump button is depressed: and
 changing the stimulation level to a previously selected stimulation level after expiration of a finite period.

13. The method claim 12 wherein the finite period is varied.

14. The method claim 12 wherein the maximum level is one of a maximum level of the animal behavior modification system or a previously defined level specified by the user.

15. The method claim 12 wherein the intensity of the stimulation level is specified by increasing at least one of a number of stimulation pulses sent in a specified period, by increasing a duration of the stimulation pulses, or by specifying a numerical stimulation level in a control command.

16. A method for an animal behavior modification system, comprising:
 transmitting wireless commands from a handheld transmitter unit to a receiver of the animal behavior modification system; and
 selecting a stimulation level and for transmitting the determined stimulation level to a receiver of the animal modification system; wherein the transmitter module is operable to operate in a normal mode wherein a user selected intensity stimulation level is commanded while a stimulation switch remains depressed, to operate in a Rise mode wherein stimulation levels are changed in a substantially continuous mode, and to operate in a Jump mode wherein stimulation levels are changed in notable discrete levels.

17. The method of claim 16 wherein the transmitter unit changes the pulse width in a continuous manner to change stimulation in a continuous manner in a Rise mode of operation.

18. The method of claim 16 wherein the transmitter unit changes the pulse width in discrete sizes to change stimulation in discrete steps in a Jump mode of operation.

19. The method of claim 16 wherein the transmitter unit specifies a desired intensity level by generating a corresponding number of pulses in a specified period or by generating pulses having a pulse width that corresponds to the desired intensity level.

20. The method of claim 16 wherein the transmitter unit specifies a desired intensity level by generating a control signal that numerically specifies a desired intensity level.

* * * * *